(12) United States Patent
Saito

(10) Patent No.: US 6,616,576 B2
(45) Date of Patent: Sep. 9, 2003

(54) APPARATUS AND METHOD FOR CONTROLLING GEAR SHIFT FOR AUTOMATIC TRANSMISSION

(75) Inventor: Yuji Saito, Shizuoka (JP)

(73) Assignee: Jatco LTD, Fuji (JP)

( * ) Notice: Subject to any disclaimer, the term of this patent is extended or adjusted under 35 U.S.C. 154(b) by 0 days.

(21) Appl. No.: 09/953,966

(22) Filed: Sep. 18, 2001

(65) Prior Publication Data
US 2002/0035009 A1 Mar. 21, 2002

(30) Foreign Application Priority Data
Sep. 18, 2000 (JP) .................................. 2000-282322

(51) Int. Cl.$^7$ .............................................. F16H 61/04
(52) U.S. Cl. ...................................... 477/154; 477/155
(58) Field of Search ................................. 477/154, 155

(56) References Cited

U.S. PATENT DOCUMENTS

| | | | | |
|---|---|---|---|---|
| 4,680,988 A | * | 7/1987 | Mori ........................... | 477/155 |
| 4,953,090 A | * | 8/1990 | Narita ......................... | 477/155 |
| 5,079,970 A | | 1/1992 | Butts et al. ................... | 74/858 |
| 5,855,533 A | | 1/1999 | Tolkacz et al. ............. | 477/110 |
| 5,888,170 A | | 3/1999 | Takiguchi et al. .......... | 477/146 |

FOREIGN PATENT DOCUMENTS

| | | |
|---|---|---|
| JP | 10-47468 | 2/1998 |
| JP | 2000-65198 | 3/2000 |
| JP | 2000-227158 | 8/2000 |

OTHER PUBLICATIONS

U.S. patent application Ser. No. 09/936,811, Murasugi et al., filed Sep. 18, 2001.
U.S. patent application Ser. No. 09/953,893, Tanaka et al., filed Sep. 18, 2001.
U.S. patent application Ser. No. 09/953,895, Saito, filed Sep. 18, 2001.
U.S. patent application Ser. No. 09/953,936, Kato, filed Sep. 18, 2001.
U.S. patent application Ser. No. 09/953,937, Saito, filed Sep. 18, 2001.
U.S. patent application Ser. No. 09/953,967, Saito, filed Sep. 18, 2001.
U.S. patent application Ser. No. 09/953,968, Saito, filed Sep. 18, 2001.
U.S. patent application Ser. No. 09/953,969, Saito, filed Sep. 18, 2001.
U.S. patent application Ser. No. 09/953,972, Saito, filed Sep. 18, 2001.
U.S. patent application Ser. No. 09/954,017, Murasugi et al., filed Sep. 18, 2001.
U.S. patent application Ser. No. 09/954,019, Saito, filed Sep. 18, 2001.
U.S. patent application Ser. No. 09/954,298, Saito, filed Sep. 18, 2001.

* cited by examiner

*Primary Examiner*—Dirk Wright
(74) *Attorney, Agent, or Firm*—Foley & Lardner

(57) ABSTRACT

In gear shift controlling method and apparatus for an automatic transmission, the automatic transmission comprising a plurality of frictional elements, a working liquid pressure for each of first and second frictional elements is controlled to make a gear shift in the automatic transmission in such a manner that while the first frictional element is released by a decrease pressure control for the working liquid pressure, the second frictional element is clutched by an increase pressure control for the working liquid pressure and a release capacity during an inertia phase during which the gear shift from a first gear range to a second gear range occurs is set in accordance with an instantaneous gear ratio during the inertia phase so as to output the release capacity set according to the instantaneous gear ratio.

20 Claims, 16 Drawing Sheets

FIG.2

|   | R/C | H/C | L/C | LR/B | L/OWC | 2-4/B |
|---|---|---|---|---|---|---|
| 1st |  |  | ○ | ◌ | ○ |  |
| 2nd |  |  | ○ |  |  | ○ |
| 3rd |  | ○ | ○ |  |  |  |
| 4th |  | ○ |  |  |  | ○ |
| Rev | ○ |  |  | ○ |  |  |

Tvo

G

GEAR RATIO

RELEASE COMMAND VALUE (Po)

CLUTCH COMMAND VALUE (Pc)

APPARATUS AND METHOD FOR CONTROLLING GEAR SHIFT FOR AUTOMATIC TRANSMISSION

BACKGROUND OF THE INVENTION a) Field of the Invention

The present invention relates to gear shift controlling system and method for an automatic transmission. Especially, in the automatic transmission, a plurality of frictional elements are provided and a gear shift is carried out in such a manner that at least a first frictional element is clutched (or engaged) or de-clutched (or released) by supplying or draining (connecting or disconnecting) a working oil for an actuator for the first frictional element with a pressure controller or the working oil of another actuator for a second frictional element is transferred from a release state to a clutched state due to a rise in pressure the working oil of the actuator for at least the first frictional element is supplied and drained (connected and disconnected) to and from the first frictional element to render the first frictional element from a release state to a clutched state due to a rise in pressure of the working oil of the actuator for a pressure controller and a pressure reduction of the working oil of the actuator for a second frictional element by a second controller causes the state of the second frictional element to be transferred from the clutch state to the release state.

b) Description of the Related Art

In the automatic transmission, a plurality of frictional elements such as clutches and brakes are selectively activated to be clutched state under a liquid pressure to determine a power transmission path (gear range) in a gear transmission system. The frictional element to be activated is switched so that a gear shift to another gear range is carried out.

It is well known that with the gear shift control for the automatic transmission, the working oil of the actuator for at least first frictional element is supplied or drained to clutch or de-clutch the first frictional element, or the working oil of the actuator for at least the frictional element is supplied or drained to shift the state of the first frictional element from the released state or clutched state due to the rise in pressure with the pressure controller and the pressure reduction of the working oil of the actuator for the second frictional element causes the second frictional element to be in the released state from the clutched state, and the gear shift from a certain gear range to another gear range is advanced.

It is noted that although the shift control system and method according to the present invention are not limited to an interchange (or clutch-to-clutch) shift of 1 versus 1 (one release element and one clutching element), one example of the interchange shift will be described below to help clarification of the background of the invention.

In this example, in the automatic transmission, the gear shift is carried out by a, s-called, interchange shift (clutch-to-clutch shift) of the frictional element in such a way that while releasing a certain frictional element due to a reduction in a working liquid pressure (pressure reduction in the working oil of the actuator by means of a pressure controller), another frictional element is clutched in response to arise in the working liquid pressure by the pressure controller.

It is noted that the frictional element to be switched from the clutch state to the release state is called a release side frictional element and its working liquid pressure is called a release side working liquid pressure. In addition, the frictional element to be switched from the release state to the clutched state is, called, a release side frictional element, and its working liquid pressure is, called, a clutch side working liquid pressure.

Hence, it is possible to complete the shift with a release-and-clutch control for these frictional elements, while the release side frictional element is released due to the rise in the clutch side working liquid pressure and the clutch side frictional element.

A Japanese Patent Application First Publication No. Heisei 2000-065198 (JP2000065198) published on Mar. 3, 2000 exemplifies a previously proposed a drive down controller. In the drive down controller, a transmission controller prevents a racing after the end of an inertia phase by setting a sum of a capacity of both clutch side and release side frictional elements during the end of shift to a value equal to or larger than an input torque ×1.0.

It is noted that the term of "racing" or "races" points to a state in which, in a case of a gear ratio in the down shift mode, the gear ratio exceeds a normal gear ratio upon the end of the gear shift and is shifted to a lower gear ratio.

SUMMARY OF THE INVENTION

As described above, the racing can be effectively be prevented according to the drive down controller disclosed in the above-described Japanese Patent Application First Publication. However, more further improvements are needed in view of the following respects.

(A) Since, according to the above-described previously proposed drive down gear shift controller, a time at which the inertia phase is ended and predicted and the gradient is determined. If the inertia phase is ended at a prediction time, a target hydraulic is reached when the inertial phase is ended.

Hence, if the end time of the inertia phase is deviated from the prediction time with actual input torque and/or release transmission torque differed from its estimated value, the hydraulic during the end of inertia phase does not become the aimed (target) hydraulic. Consequently, a racing prevention function that the drive down controller has cannot sufficiently be exhibited.

(B) Next, referring to FIGS. 16A and 16B, FIG. 16A shows a case where an actual input torque is larger than that the controller recognizes or a release transmission is smaller than that the controller recognizes (too early (or too fast) in the advance of gear shift) and FIG. 16B shows a case wherein the actual input torque is smaller than that the controller recognizes (too slow (too late) in the advance the gear shift).

In FIGS. 16A and 16B, concerning with the gear ratio, a variation in the actual gear ratio is denoted by a solid line and a variation in a predicted gear ratio is denoted by a broken line. In addition, A denotes the aimed, viz., the target hydraulic at the time of inertia phase end (at the release command pressure side), A' denotes the aimed, viz., the target hydraulic at the time of the end of inertia phase (clutch command pressure side), B denotes the aimed hydraulic, viz., the target hydraulic at the release command pressure side when the inertia phase is actually ended and B' denotes the hydraulic at a side of the clutch command pressure when the inertia phase is actually ended.

In either of the cases shown in FIGS. 16A and 16B, the actual input torque and release transmission torque are different from their estimated values and the end time of the inertia phase is deviated from the predicted time. At this time, the hydraulic at the time of end of inertia phase does not become the aimed one. In the case of FIG. 16A(too early in the advance of the gear shift), each hydraulic B and B' at which the actual inertia phase is lowered than the aimed hydraulic A and A' at the time of ending the inertia phase.

In the case of FIG. 16B, (it is slow in advancing the gear shift) the hydraulic B when the inertia phase is actually ended is in excess of the aimed hydraulic A when the inertia phase is ended. In this way, the hydraulic is not easy to be settled as desired.

Hence, when the advance in the gear shift is too early (FIG. 16A), the release pressure is ended with small release pressure. At this time, there is a great possibility in the occurrence in racing. When the gear shift is slow in advancing the gear shift (FIG. 16B), the release pressure is furthermore raised so that it further becomes difficult to advance the gear shift.

(C) Hence, it is desired to avoid the above-described state by an introduction of new ideas and new techniques and to secure an appropriate gear shift control for the automatic transmission.

It is, hence, an object of the present invention to provide improved gear shift controlling system and method for an automatic transmission which are capable of performing a suitable gear shift by controlling the working oil of actuator for at least the first frictional element through the pressure controller and applying this control of the working oil to the gear shift control from the first gear range to the second gear range.

According to a first aspect of the present invention there is provided with a gear shift controlling apparatus for an automatic transmission, the automatic transmission comprising a plurality of frictional elements and a pressure controller connecting and disconnecting an actuator working liquid pressure for at least a first frictional element from among the frictional elements to make a gear shift from a first gear range to a second gear range, the gear shift controlling apparatus comprising: a pressure controlling section that controls a pressure of the actuator working liquid to vary a torque transmission capacity of the first frictional element; and a torque transmission capacity setting section that sets the torque transmission capacity according to a gear ratio which varies in accordance with a gear shift from the first gear range to the second gear range, during an inertia phase during which the gear shift from the first gear range to the second gear range occurs.

According to a second aspect of the present invention, there is provided a gear shift controlling apparatus for an automatic transmission, the automatic transmission comprising: a plurality of frictional elements; a first pressure controller to raise an actuator working oil pressure of at least a first one of the frictional elements to transfer the actuator working oil from a release state of the first frictional element to a clutch state thereof; and a second pressure controller to reduce an actuator working oil pressure of at least a second one of the frictional elements to transfer the actuator working oil from the clutch state of the second frictional element to the release state thereof, whereby the automatic transmission makes a gear shift from a first gear range to a second gear range, the gear shift controlling apparatus comprising: a first pressure controlling section that controls a first torque transmission capacity for the first frictional element through the first pressure controller; a second pressure controlling section that controls a second torque transmission capacity for the second frictional element through the second pressure controller; and a torque transmission capacity setting section that sets each of the first and second torque transmission capacities according to a gear ratio which varies in accordance with a gear shift from the first gear range to the second gear range, during an inertia phase during which the gear shift from the first gear range to the second gear range occurs.

According to a third aspect of the present invention, there is provided with a gear shift controlling apparatus for an automatic transmission, the automatic transmission comprising a plurality of frictional elements and the automatic transmission being enabled to make a gear shift by a release-to-clutch control in such a manner that while a first one of the frictional elements is released by a decrease pressure control for a working liquid pressure, a second one of the frictional elements is clutched by an increase pressure control for the working liquid pressure, the gear shift controlling apparatus comprising: a release-to-clutch controlling section that controls the working liquid pressure for each of the first and second frictional elements to make the gear shift in the automatic transmission in such a manner that while the first frictional element is released by the decrease pressure control for the working liquid pressure, the second frictional element is clutched by the increase pressure control for the working liquid pressure; and a release capacity setting section that sets a release capacity during an inertia phase during which the gear shift from a first gear range to a second gear range occurs in accordance with an instantaneous gear ratio during the inertia phase so as to output the release capacity set according to the instantaneous gear ratio.

According to a fourth aspect of the present invention, there is provided with a gear shift controlling method for an automatic transmission, the automatic transmission comprising a plurality of frictional elements and a pressure controller connecting and disconnecting an actuator working liquid pressure for at least a first one of the frictional elements to make a gear shift from a first gear range to a second gear range, the gear shift controlling method comprising: controlling a pressure of the actuator working liquid to vary a torque transmission capacity of the first frictional element; and setting the torque transmission capacity according to a gear ratio which varies in accordance with a gear shift from the first gear range to the second gear range, during an inertia phase during which the gear shift from the first gear range to the second gear range occurs.

According to a fifth aspect of the present invention, there is provided with a gear shift controlling method for an automatic transmission, the automatic transmission comprising: a plurality of frictional elements; a first pressure controller to raise an actuator working oil pressure of at least a first one of the frictional elements to-transfer the actuator working oil from a release state of the first frictional element to a clutch state thereof; and a second pressure controller to reduce an actuator working oil pressure of at least a second one of the frictional elements to transfer the actuator working oil from the clutch data of the second frictional element to the release state thereof, whereby the automatic transmission makes a gear shift from a first gear range to a second gear range, the gear shift controlling method comprising: controlling a first torque transmission capacity for the first frictional element through the first pressure controller; controlling a second torque transmission capacity for the second frictional element through the second pressure controller; and setting each of the first and second torque transmission capacities according to a gear ratio which varies in accordance with a gear shift from the first gear range to the second gear range during an inertia phase during which the gear shift from the first gear range to the second gear range occurs.

According to a sixth aspect of the present invention, there is provided with a gear shift controlling method for an automatic transmission, the automatic transmission comprising a plurality of frictional elements and the automatic transmission being enabled to make a gear shift by a release-to-clutch control in such a manner that while a first one of the frictional elements is released by a decrease pressure control for a working liquid pressure, a second one of the frictional elements is clutched by an increase pressure control for the working liquid pressure, the gear shift controlling method comprising: controlling the working liquid pressure for each of the first and second frictional elements to make the gear shift in the automatic transmission in such a manner that while the first frictional element is released by the decrease pressure control for the working liquid pressure, the second frictional element is clutched by the increase pressure control for the working liquid pressure; and setting a release capacity during an inertia phase during which the gear shift from a first gear range to a second gear range occurs in accordance with an instantaneous gear ratio during the inertia phase so as to output the release capacity set according to the instantaneous gear ratio.

This summary of the invention does not necessarily describe all necessary features so that the invention may also be a sub-combination of these described features.

The other objects and features of this invention will become understood from the following description with reference to the accompanying drawings.

BRIEF DESCRIPTION OF THE DRAWINGS

FIG. 2 is a table representing a relationship between selected gear ranges and clutch logics of frictional elements in the automatic transmission shown in FIG. 1A.

DETAILED DESCRIPTION OF THE PREFERRED EMBODIMENT

Reference will hereinafter be made to the drawings in order to facilitate a better understanding of the present invention.

Figures 1A, 1B:
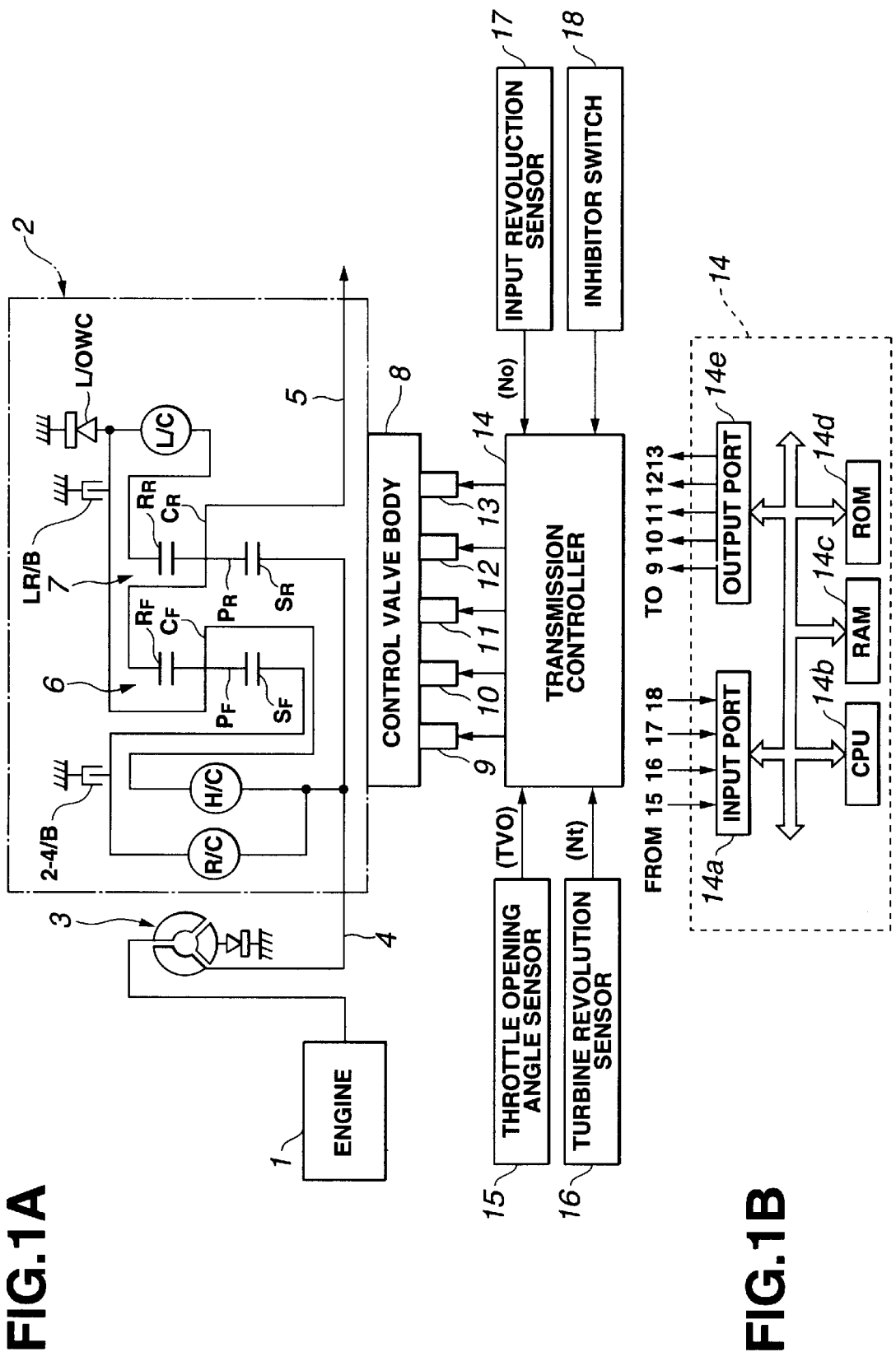
FIG. 1A is a schematic system configuration view representing a transmission row of an automatic transmission in which a gear shift controlling apparatus in a preferred embodiment according to the present invention is applicable and the gear shift controlling apparatus.
FIG. 1B is a schematic view of an internal circuit of a transmission controller shown in FIG. 1A.

FIG. 1A shows a shift controlling apparatus for an automatic transmission in a preferred embodiment according to the present invention.

FIG. 1B shows an internal circuit of a transmission controller shown in FIG. 1A.

In FIG. 1A, reference numeral 1 denotes an engine and reference numeral 2 denotes an automatic transmission.

An output of engine 1 is adjusted by a throttle valve which increases and decreases its opening angle (TVO) from a full open state to a full close state in response to a depression of an accelerator pedal on which a vehicular driver depresses. An output revolution of engine 1 is inputted to an input axle 4 of automatic transmission 2 via a torque converter 3.

Automatic transmission 2 includes an input axle 4 and an output axle 5, both axles being disposed coaxially and faced with each other, a front planetary gear pair 6, a rear planetary gear pair 7 sequentially from a side of engine 1, these pairs being a main component of a planetary gear mechanism in automatic transmission 2.

Front planetary gear pair 6 placed in a proximity to engine 1 includes a simple planetary gear pair having a front sun gear $S_F$; a front ring gear $R_F$; and a front pinion $P_F$ meshed with front sun gear and front ring $R_F$.

Rear planetary gear pair 7 placed in a far-away position from engine 1 includes another simple planetary gear pair 7 having a rear planetary gear pair 7, a rear ring gear $R_R$, a rear pinion $P_R$ meshed with these pairs; and a rear carrier $C_R$ for supporting rotatably rear pinion.

Frictional elements determining the transmission path (gear range) of planetary gear mechanism includes: a rotary clutch L/C; 2nd-speed-and-4th-speed brake 2-4/B; a high clutch H/C, a low reverse brake L-R/B, a low one-way clutch L/OWC, and a reverse clutch R/C. These frictional elements are correlative to components of both planetary gear pairs 6 and 7 as described below. In details, front sun gear $S_F$ is properly connectable to input axle 4 via a reverse clutch R/C and is properly fixable with 2nd-4th brake 2-4/B.

Front carrier $C_F$ is properly connectable to input axle 4 with a high clutch H/C.

Front carrier $C_F$, furthermore, serves to block a rotation in an appropriate direction to an engine revolution with a low one-way clutch L/OWC and is properly fixable with a low reverse brake LR/B.

Low clutch L/C is properly connectable between front carrier $C_F$ and rear ring gear $R_R$.

Both front ring gear $R_F$ and rear carrier $C_R$ are mutually interconnected, front ring gear $R_F$ and rear carrier $C_R$ are connected to output axle 6, and rear sun gear $S_R$ is connected to input axle 4.

Figure 2:
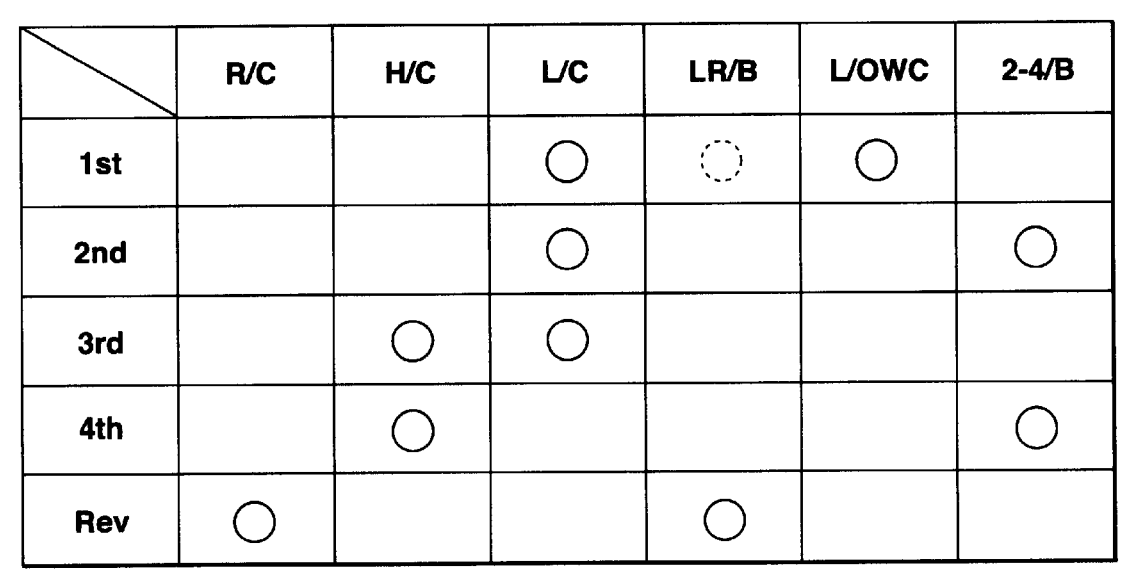

A power transmission row of planetary gear shift mechanism can obtain a forward first speed (1st); a forward second-speed (2nd); a forward third-speed (3rd); a forward fourth-speed (4th); and a reverse gear shift range (Rev) with a selective hydraulic operation (clutch) shown by a circle mark ○ in FIG. 2 frictional elements L/C, 2-4/B. H/C, LR/B, R/C and self-engagement shown by a mark ○ in solid line in low one-way clutch L/OWC.

It is noted that a hydraulic operation by a circle mark ○ in a dot line shown in FIG. 2 is a frictional element to be operated required during an engine braking.

A clutch logic of gear shift controlling frictional elements shown in FIG. 2, L/C, 2-4/B, H/C, LR/B, and R/C can be achieved by a control valve body 8 shown in FIG. 1A, line pressure solenoid 9, low-clutch solenoid 10, 2nd-speed-and-4th-speed brake solenoid 11, a high clutch solenoid 12, and a low reverse brake solenoid 13 are inserted into a line pressure solenoid 9, a low clutch solenoid 10, a 2nd-and-4th-speed brake solenoid 11, a high clutch solenoid 12, and a low reverse brake solenoid 13 in addition to a manual valve not shown.

A line pressure solenoid 9 exchanges high and low line pressures which are original pressures of a shift control (a line pressure of an original pressure means the line pressure which is the hydraulic at a time when a certain frictional element is in an engaged state. The manual valve (not shown) can be operated into these portions according to the vehicular driver's manipulation depending on a running state the vehicular driver desires to do; forward run (D) range position; a reverse run (R) range position; or parking (P, N) range position.

At the D range, the manual valve supplies the line pressure to a predetermined hydraulic circuit so as to enable the individual control over the working hydraulic of a low clutch solenoid 10, 2nd-and-4th -speed brake solenoid 11, the high clutch solenoid 12, the low reverse brake LR/B through a pulse duty ratio control over the low clutch solenoid 10, the high clutch solenoid 12, and a low reverse brake solenoid 13. The duty ratio control over each solenoid described above can achieve the clutch logic from among first-speed range to fourth-speed range shown in FIG. 2.

At the R range, the manual valve directly supplies the line pressure to reverse clutch R/C independently of the duty ratio control for each of the solenoids described above. The low reverse brake LR/B supplies the hydraulic controlled by the duty ratio control of each solenoid so as to make these clutch operated to achieve the clutch logic of the reverse shown in FIG. 2.

It is noted that the manual valve in P and N ranges does not supply the line pressure in any hydraulic circuit and the automatic transmission is set in a neutral state with all frictional elements set in the release state.

The duty ratio control of the on-and-off control of line pressure solenoid 10, 2nd-and-4th-speed brake solenoid 9 and low clutch solenoid 10, 2nd-speed-and-4th-speed brake solenoid 11, high clutch solenoid 12, and low reverse brake solenoid 13 is executed respectively by transmission controller 14. Transmission controller 14 receives signals from a throttle opening angle sensor 15 detecting in an opening angle TVO of the throttle valve of engine 1, a turbine revolution sensor 11 detecting a turbine rotation number (input axle revolution number per minutes of transmission) of torque converter 3; a signal from output rotation sensor 17 detecting a rotation number No of output axle 5 of automatic transmission 2; a signal from an inhibitor switch 18 detecting a selected speed range.

Transmission controller 14 includes a microcomputer. The microcomputer includes an Input Port 14a to receive the signals (throttle opening angle TVO, turbine revolution Nt, output revolution No, and selected gear range) from various sensors such as throttle opening angle sensor 15, turbine revolution sensor 16, input revolution sensor 17, and the inhibitor switch 18, a CPU (Central Processing Unit) 14b, a RAM (Random Access Memory) 14c, a ROM (Read Only Memory) 14d, an Output Port 14e to output control signals to line pressure solenoid 9 and each solenoid 10 through 13. ROM 14d stores control programs to perform the gear shift control executed by CPU 14b, various kinds of control programs such as a line pressure control program. RAM 14c stores temporarily various kinds of information and results of calculations executed by CPU 14a.

In the gear shift control, as a result of a gear shift determination, while the reduction control in working oil pressure for the release side frictional elements to be determines to be released, basically, causes these release side frictional elements to be released, the rise control in working hydraulic (oil pressure) for the clutch side frictional elements to be determined to be clutched, basically, causes these clutch side frictional elements to be clutched. Thus, the gear shift can be carried out. For example, during the occurrence of second speed range to third speed range shift and occurrence of third speed range to second speed range shift, as appreciated from FIG. 2, 2nd-speed-and-4th-speed brake 2-4/B is released and high clutch H/C is clutched and vice versa. In addition, during the occurrence of third speed range to fourth speed range and the occurrence of fourth speed range to third speed range, low clutch L/C is released and second-speed-and-fourth-speed brake 2-4/B is clutched and vise versa.

It can be said that, in this embodiment, a pressure controller to control the working oils of actuators for corresponding release-side frictional elements and those for clutch-side frictional elements are constituted by control valve body 8 and transmission controller 14.

Next, automatic transmission action at the D range will be described below.

Transmission controller 14 executes a control program (not shown) and searches an appropriate gear range required in the present driving state from throttle opening angle TVO and transmission output revolution speed No (this corresponds to a vehicular velocity) on the basis of a gear shift map.

Transmission controller 14 determines whether the presently selected gear range is made coincident with an appropriate gear speed range. If not coincident with each other, transmission controller 14 issues a gear shift command to execute the gear shift to an appropriate gear range (down shit or up shift). That is to say, on the basis of the clutch logic table shown in FIG. 2, the duty ratio control for the solenoids 10 through 13 so as to perform the clutch and release switching of the frictional elements to make the gear shift, thus the working oil for the corresponding frictional elements being modified.

Furthermore, in the control over the working oil pressure, automatic controller 14 executes such control as described below in order to perform a gear ratio following hydraulic control (a gear ratio following control at a drive down release pressure or gear ratio following control under a clutching and release pressure) as an example of a case of the drive down shift.

That is to say, in this example, preferably, (1) Such that a clutching or release capacity during an inertia phase is set according to a gear ratio (defined as an effective gear ratio i represented by an input-and-output axle revolution ratio Nt/No during the gear shift) at a time point of clutching or releasing (not such a gradient control as described in the Japanese Patent Application First Publication No. JP2000-065198 recited in THE BACKGROUND OF THE INVENTION but such a control that the capacity in accordance with the gear ratio is outputted) is also executed.

Figure 3A:
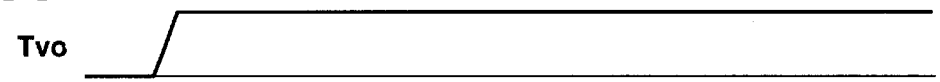
FIGS. 3A, 3B, and 3C are integrally a timing chart on a time series variation of clutch side working liquid pressure command value showing an example of a case where the gear shift controlling apparatus shown in FIG. 1A carries out a, so-called, a drive down interchange gear shift.
Figure 3B:
Figure 3C:
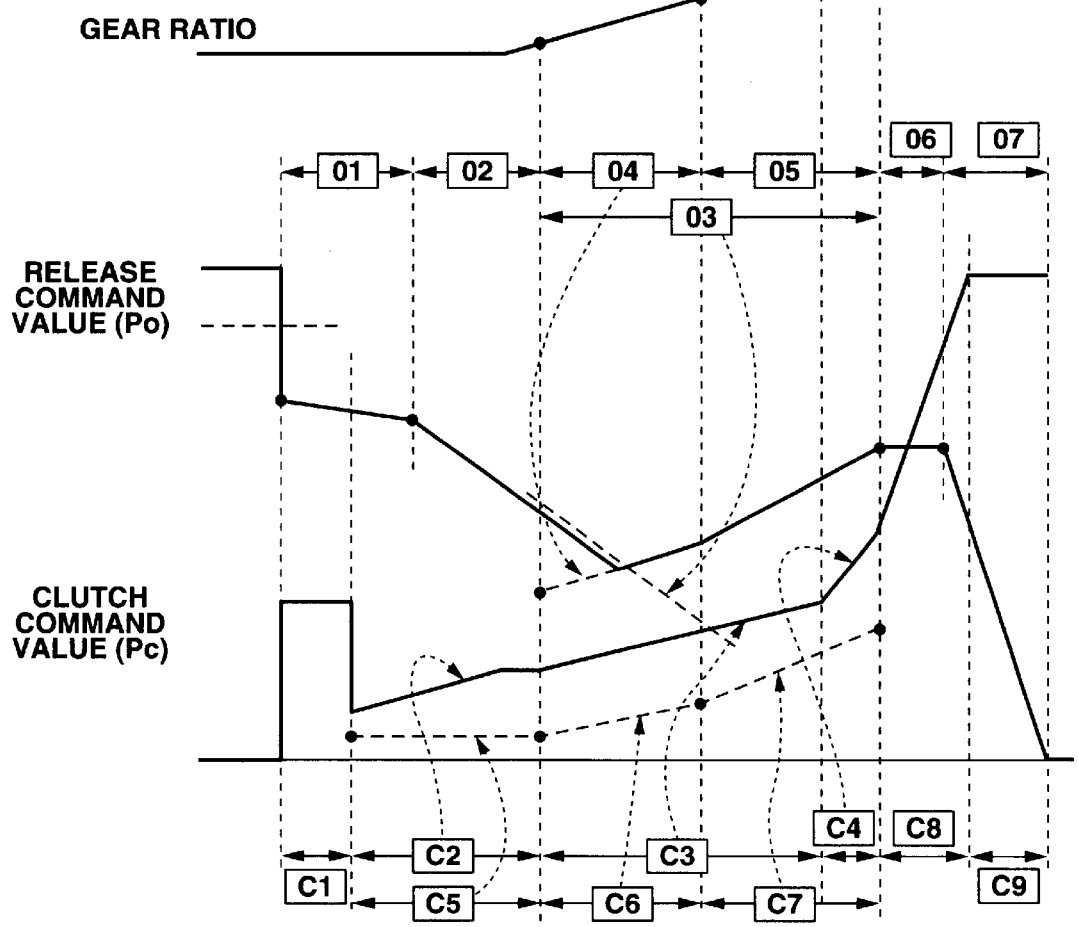

In this case, preferably, (2) The contents of control can be such that the calculation of (1) is carried out from a time point of inertia phase start so that the capacity is not discontinuous during the inertia phase (for example, refer to a control start period during a time interval of ○4 (04) in FIGS. 3A, 3B, and 3C) and, preferably, (3) The capacity is determined for each gear ratio so-that the capacity is small at a time immediately after an initial phase start during a drive down shift, the turbine revolution (Nt) is quickly raised, and becomes larger as it becomes nearer to an end of inertia phase.

More appropriately, such a structure can be adopted that in such a drive down shift as to be equal to or larger than the predetermined value of throttle valve opening angle, a torque transmission capacity of such a release side frictional element as from the clutched state to the released state is set in accordance with the gear ratio so that the inertia phase end time period becomes larger from the inertial phase start period.

In this way, a target capacity of clutch or releasing pressure can be obtained during the end of inertia phase even if the variation in actual gear ratio is deviated from a predicted variation (refer to FIG. 9) according to item (1) and another performance equivalent to the drive down gear shift control described in JP2000-061598 can be secured according to items (2) and (3).

Such an interchange gear shift that while releasing a certain frictional element through a reduction in the working oil pressure (hydraulic), another frictional element is clutched through the rise in the working oil pressure will herein be described.

When a gear shift in the way as the interchange gear shift described above is, for example, a case where a prime mover such as engine 1 is driven which is involved in an accelerator pedal manipulation, automatic controller 14 can provide, as shown in FIGS. 3A, 3B, and 3C, a release side operation liquid pressure command value Po which is a command value for a working oil pressure on one of frictional elements to be released and a clutch side working liquid pressure command value Pc which is a command value for a working oil pressure on one of frictional elements to be clutched.

FIGS. 3A, 3B, and 3C show integrally examples of variation transitions of release side working liquid pressure command value Po and the clutch side working liquid pressure command value Pc for a time interval from an instantaneous time at which the gear shift command is issued to a time at which the gear shift control is ended including the variation transitions on the throttle valve opening angle TVO, G (Gravity) (G waveform) and the gear ratio.

In FIGS. 3A through 3C, basic features and targets in release side control time intervals 01 through 07 (in FIG. 3C, 01 through 07 are described but, for the explanation thereof, ○1 through ○7 will be used hereinbelow), and in clutch side control time intervals C1 through C9 will be described below.

First, clutch side working liquid pressure command value Pc will be explained below:

C1 (Control) Interval of Time:

During a C1 interval of time from the instantaneous time at which the gear shift command (down shift command) is issued, command value Pc is set to a high pre-charge pressure in order to have a loss stroke of the clutch side frictional element ended as early as possible. During C1 interval of time, this control is such as to have a piston stroke advanced.

C2 Through C4 (Control) Intervals of Time:

During C2 through C4 intervals of time, such a control as-to have the piston stroke advance is carried out.

During C2 through C4 intervals of time, it is an aim that the piston stroke is always ended before the end of inertia phase even with a variation in the hydraulic and an increase in a tubular passage taken into consideration.

<<Since the gear shift is started in response to the vehicular driver's depression on the accelerator pedal, it is necessary to have the inertia phase ended within a range of time the vehicular driver does not feel a lag against a gear shift. Hence, this control is needed to guarantee that the piston stroke is ended within at least this time range.>>

In the example shown in FIG. 3C, during the interval of time subsequent to C1 interval of time, the control during C1 interval of time provides the high pre-charge pressure. In this case, the shock occurs in a case where the control remains unchanged, viz., continues to provide the high pre-charge pressure. Hence, the command value Pc is once reduced to a lower value than the pre-charge pressure and, thereafter, is gradually increased by different gradients in a sequence of C2, C3, and C4 so that it can be guaranteed that the piston stroke is always ended within a predetermined interval of time even if a looseness in the frictional element and a deviation in the working oil are found. Basically, this variation in the command value Pc permits an assurance of the end of stroke within the predetermined period of time in the clutch side frictional element and the clutch capacity can be started to have within the predetermined period of time.

C5 Through C7 (Control) Intervals of Time:

Such a control as to secure the capacity required in the clutch side frictional element is carried out.

The controls at C2 through C4 intervals of time and at C5 through C7 intervals of time serve to guarantee the clutch side frictional element at the end of inertia phase.

C8 (Control) Intervals of Time:

After the end of inertia phase, the hydraulic is raised up to a MAX (maximum) pressure which is the hydraulic when the frictional element is in the clutched state.

<<it is noted that, naturally, a stepwise rise in the hydraulic may be permitted. However, if the racing described above should occur and the stepwise rise in the hydraulic should occur, a violent shock would occur. Hence, the rise in the hydraulic in C8 (control) interval of time is carried out by an oblique gradient.

C9 (Control) Interval of Time:

During C9 interval of time, the command value Pc is held at MAX pressure. Until the end of 06 and 07 (○6 control and ○7 control), the command value Pc is held at MAX pressure to wait for the gear shift control. Next, release side working liquid pressure command value Po will be described below.

○1 (O1) (Control) Interval of Time:

The command value Pc is reduced in a stepwise manner to a predetermined value in order to secure a release response of release side frictional element from an instantaneous time at which the gear shift command value is issued. After the entrance of control phase into a 02 (○2) interval of time, the hydraulic is reduced to the hydraulic at which the inertia phase is predicted to be started plus the hydraulic corresponding to a margin with the deviation thereof in mind so that the inertia phase is started at an appropriate time.

It is noted that the term of appropriate time means that the lag is not noticeable and satisfies that a preparation time interval enough to transfer the hydraulic control into the inertia phase without an abrupt variation in release hydraulic to secure a controllability of hydraulic for release side frictional element during the inertia phase.

○2 (Control) Interval of Time:

In order to determine the hydraulic at which the inertia phase is started, the hydraulic is reduced obliquely by an gradient (oblique gradient). The clutch is started to slide at a time point at which the capacity of release side frictional element is reduced and is defeated by a turbine torque and the inertia phase is started.

<<If the gradient is too moderate, there are large deviations in the timing at which the inertia phase is started than the deviation in the hydraulic. If the gradient is too steep, the advance of the gear shift after the start of inertia phase becomes too quick. Hence, during ○4 and ○5 control (04 and 05 controls), the response of the hydraulic is too late to be out of time. In a case where a difference in the turbine revolution after and before the gear shift is small, the end of the piston stroke at the clutch side does not become in time and brings out the racing.

○3 (Control) Interval of Time:

After detecting the start of initial phase, the hydraulic at the time of detection of inertia phase start is connected to that created by ○4 control and ○5 (04 and 05) control.

<<In order to prevent a variation in the hydraulic in a stepwise manner at the time of detection of the start of inertia phase, magnitudes of the hydraulic at ○4 control time interval and that at ○5 control interval of time are compared with each other and one of the hydraulics (working liquid pressures) which is larger in magnitude than the other is outputted. Hence, at a time point the hydraulic is reduced below the larger hydraulic required at a concept of 04 (○4), 05 (○5) (control) interval of time. 03 (○3) (control) interval of time is automatically switched to 04, 05 control. Specifically, the hydraulic is drained at the gradient equal to ○2 control. Then, the larger hydraulic is outputted according to a comparison in magnitude determined from ○4 and ○5 controls.>>

○4 to ○5 (Control) Interval of Time:

The advance in gear shift is delayed by providing the capacity for the hydraulic so that a soft landing is the target of the turbine revolution during the end of inertia phase.

Figure 4:
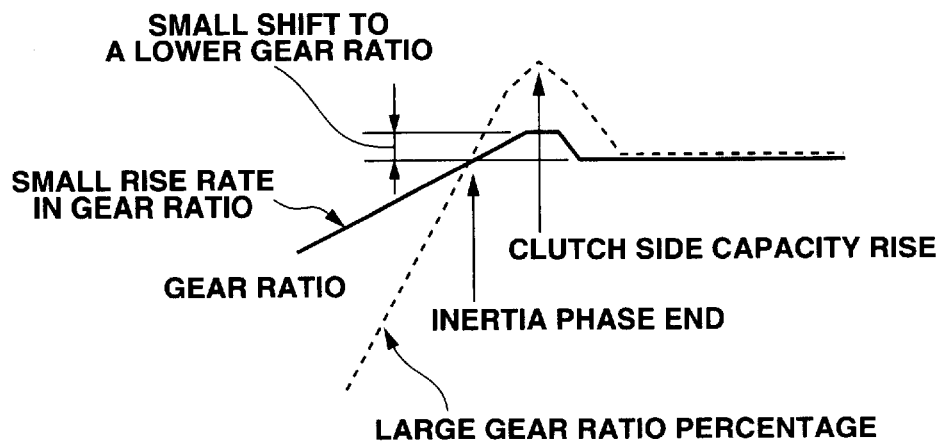
FIG. 4 is an explanatory view for explaining contents of a release side control in the timing chart shown in FIGS. 3A, 3B, and 3C.

<<Due to a reduction in a variation rate in the turbine revolution at the time of inertia phase, its absorbing inertia quantity is reduced and the shock is reduced in a case where a clutch timing of the clutch side frictional element is deviated from a normal timing as appreciated from FIG. 4.>>

FIG. 4 shows a case where a variation rate of a rise in the gear ratio is small (solid line) as compared with a case wherein the rise rate in gear ratio is large (dot line) even if an inertia phase is ended at the same timing and the rise in the capacity at the clutch side frictional element occurs, ○4 to ○5 control causes the rise rate of the gear ratio to be small. It will be appreciated that inertia variation rate due to the clutch side capacity (racing quantity and revolution speed forcibly drawn up revolution speed) can be reduced.

A provision of the capacity for the hydraulic causes a pull-in torque developed due to the provision of a capacity for the clutch side frictional element to be small. The pull-in torque means that the torque of output axle 6 is abruptly varied in a deceleration direction. The release side capacity in the inertia phase acts on the output axle torque in a positive direction of the output axle torque (refer to FIG. 5).

Figure 5:
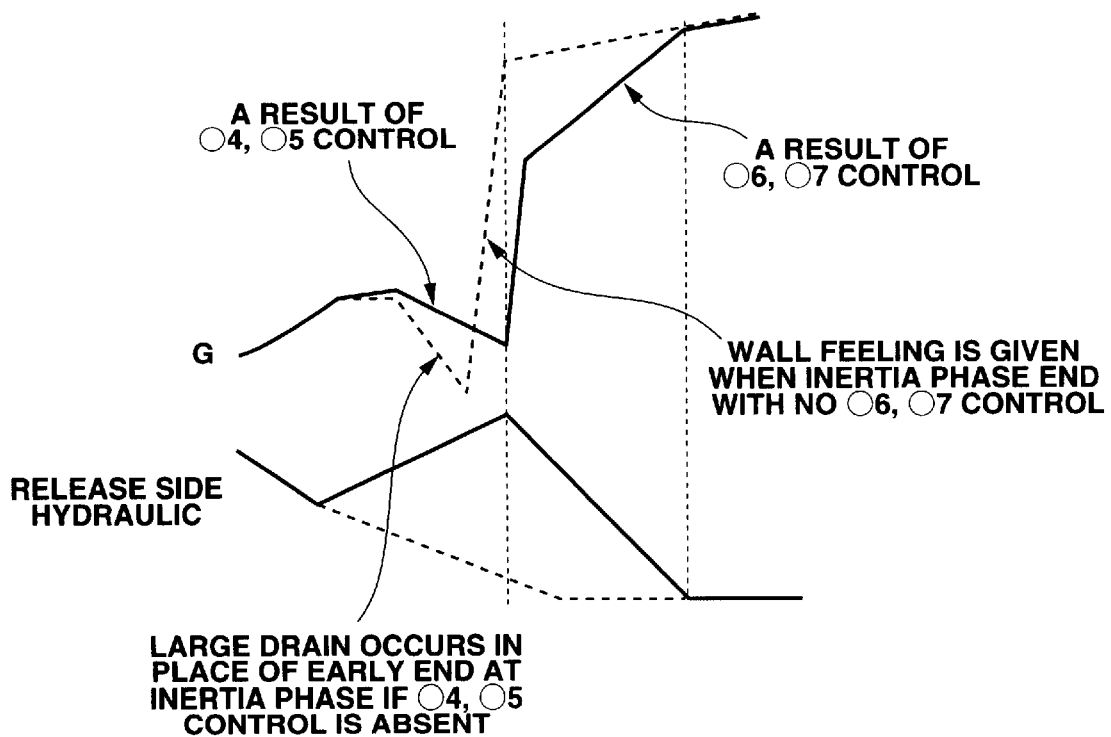
FIG. 5 is an explanatory view for explaining the contents of the release side control shown in FIGS. 3A, 3B, and 3C.

It is noted that a setting processing of the release side capacity is carried out during the inertia phase acts on the output axle torque in a positive direction of the output axle torque (refer to FIG. 5).

It is noted that a set processing of the release side capacity is carried out during the inertia phase to follow the gear ratio so that the release side capacity is in accordance with the instantaneous (or momentary) gear ratio (the inertia phase start point of time can be included).

The details thereof will be described later with reference to the control program of a hydraulic calculation routine during an inertia phase.

○6 to ○7 (Control) Interval of Time:

In order to prevent a wall feeling (this meaning will be described below) after the end of inertia phase from occurring, the release side hydraulic is pulled and the torque is treated like a chamfering (refer to FIG. 5).

FIG. 5 shows a variation of G with a release side control (○4 (04) through ○7 (07)) (control) interval of time upon the start of inertia phase as compared with a case of an absence of (○4 (04) through ○7 (07) (control) intervals of time (denoted by a dot line).

First, as shown in FIG. 5, if ○4 (04)•○5 (05) control is absent, the pull becomes large (denoted by the dot line) in place of the earlier end of inertia phase (denoted by the solid line). On the other hand, as a result of ○4 (04)

○5 (05) control, the pull during the inertia phase becomes small. It will be appreciated that the chamfering action of torque is present as the result of ○6 (06)•○7 (07) control (solid line).

If the racing occurs after the end of inertia phase, the release side hydraulic is held for a while in order to prevent a sudden racing if the racing occurs upon the end of inertia phase and the rate of rise in revolution of output axle 6 is made small.

In this way, during ○7 (07) interval of time, release side working liquid pressure command value is finally zeroed (Po=0) by reducing the command value Po at a predetermined variation rate (obliquely draining control of release pressure after the end of inertia phase).

It is noted that the term of wall feeling described above indicates a state in which a vehicular longitudinal acceleration is abruptly raised (in the case of the drive down, this means that the vehicular longitudinal acceleration reaches abruptly from a relatively low acceleration state during the inertia phase to a relatively high acceleration data after the end of gear shift, after the inertia phase is ended.

Figure 6:
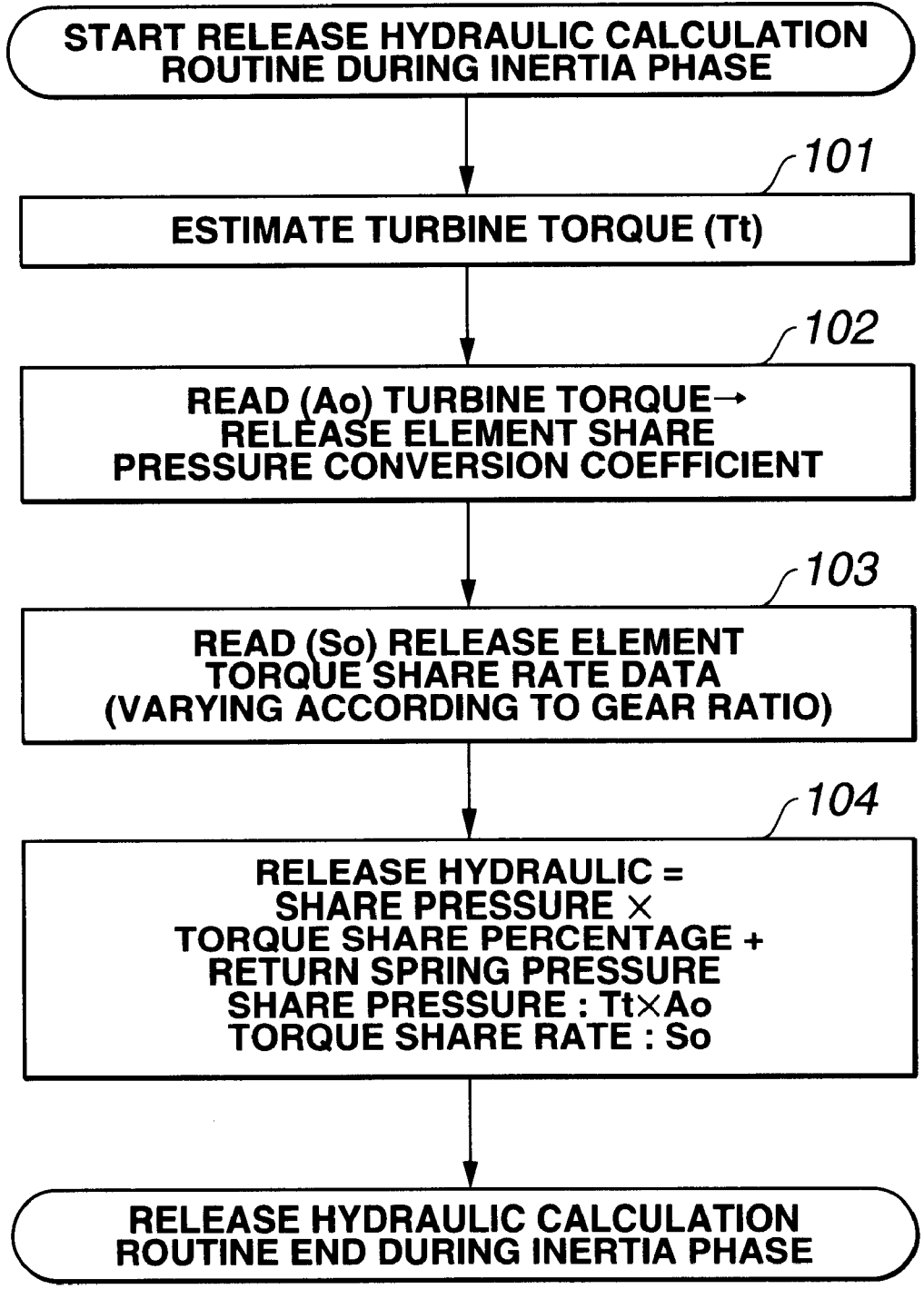
FIG. 6 is an operational flowchart representing an example of a gear ratio following hydraulic control procedure executed in the drive down interchange gear shift by the transmission controller shown in FIG. 1A and representing an example of a release hydraulic (release side command pressure) calculation routine during an inertia phase.

FIG. 6 shows operational flowchart representing an example of a calculation routine on a release hydraulic during an inertia phase for hydraulic control process of a gear ratio following type in which a safety percentage in the inertia phase during the drive down shifting occurs (setting of release side working liquid pressure command value (Pc)).

Figure 7:
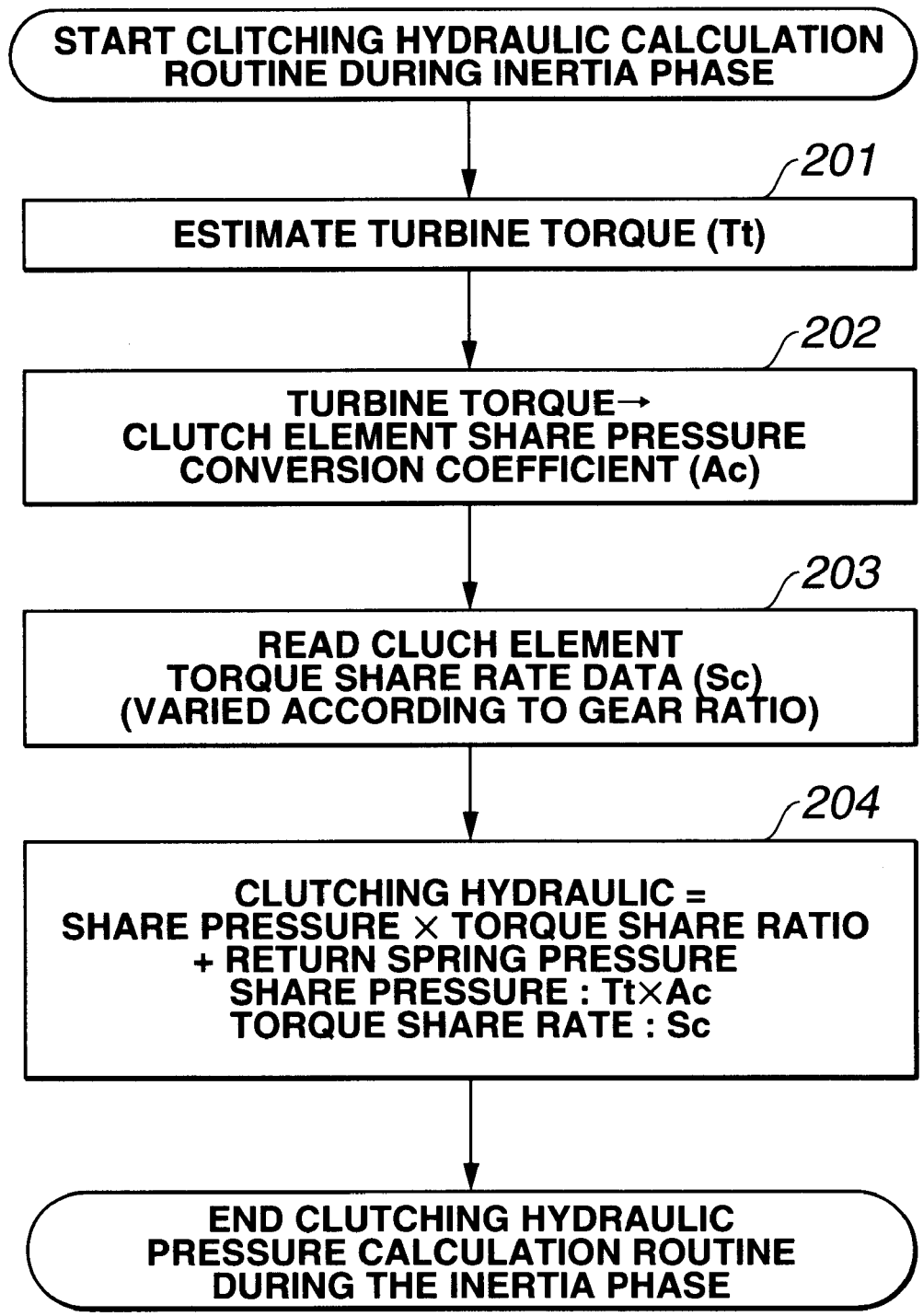
FIG. 7 is an operational flowchart representing an example of the gear ratio following hydraulic control procedure executed in the drive down interchange gear shift by the transmission controller shown in FIG. 1A and representing an example of a clutch hydraulic (clutch side command pressure) calculation routine during the inertia phase.

FIG. 7 shows an operational flowchart representing an example of a clutching (clutch) hydraulic calculation during the inertia phase (setting of a clutch side working liquid pressure command value (Po)).

When automatic controller 14 executes the same gear ratio following control of the release pressure for the clutch side working liquid pressure, transmission controller 14 can execute the control program corresponding to FIGS. 6 and 7 in a form of a regular interrupt routine.

The control contents are shown in FIGS. 9A through 15.

In FIG. 6, the release hydraulic calculation routine during inertia phase is started in response to the timer interrupt.

At a step 101, a turbine torque Tt is estimated. In details, transmission controller 14 reads a map according to Nt (turbine revolution speed)×TVO (throttle valve opening angle) to estimate turbine torque Tt or estimates turbine torque Tt using an engine torque indicative signal derived from an engine output controller (not shown) associated with engine 1×(T/C) (a torque ratio of torque converter 3).

At a step 102, transmission controller 14 reads a release element share pressure conversion coefficient (Ao) from estimated turbine torque Tt.

The coefficient can be derived according to, for example, a frictional coefficient of a frictional material, a clutch diameter, a number of sheets of clutch, a share pressure to a piston area input torque.

Figure 8:
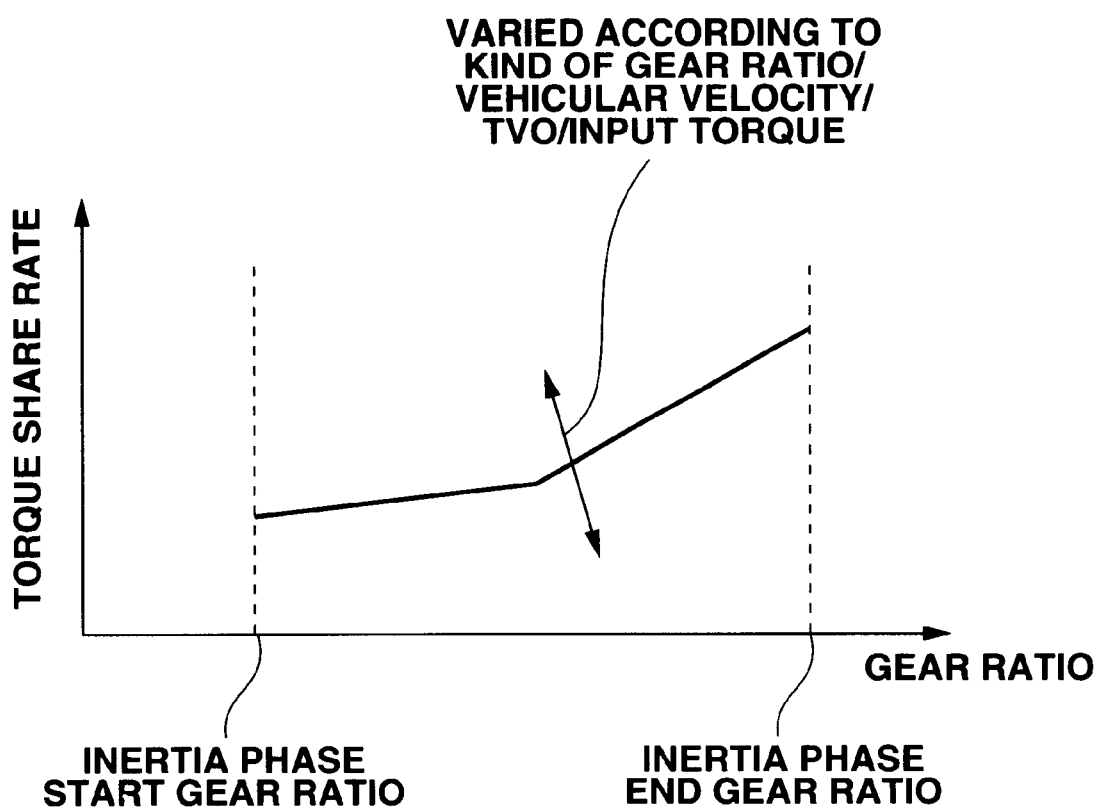
FIG. 8 is a characteristic graph representing an example of a torque share rate (percentage) data to a gear ratio applicable to the gear ratio following hydraulic control procedure shown in FIGS. 6 and 7.

At the next step 103, transmission controller 14 reads a release element torque share rate data (So) which varies according to the gear ratio from the present (instantaneous) gear ratio on the basis of a data structure shown in FIG. 8, namely, a gear ratio-torque share rated at a map previously set in accordance with the gear ratio at the time of inertia phase start through that at the time of inertia end.

It is noted that the gear ratio-torque share rate data can have a characteristic tendency as shown in FIG. 8 and can be further varied according to gear shift kinds, vehicular velocity, throttle valve opening angle TVO, transmission input torque, and so forth.

At the next step 104, transmission controller 14 calculates the release side hydraulic (Pc) using the share pressure, viz., Tt×Ao, torque share rate (RTN pressure) which is a hydraulic corresponding to a return spring at a time of a maximum stroke of the piston.

That is to say, release hydraulic=share pressure X torque share rate+return spring pressure (RTN pressure).

Then, the same control is carried out for clutch side frictional element.

Transmission controller 14 subsequently starts a clutch (clutching) hydraulic calculation routine during an inertia phase in FIG. 7.

At a step 201, transmission controller 14 estimates turbine torque Tt in the same way as step 101 in FIG. 6.

At a step 202, transmission controller 14 reads clutch element share pressure conversion coefficient data (Ac) from estimated turbine torque Tt in the same manner as step 102 in FIG. 6.

At a step 203, transmission controller 14 reads the clutch element torque share rate data (Sc) according to the map shown in FIG. 8 in the same manner as step 103 in FIG. 6.

At a step 204, transmission controller 14 calculates clutch hydraulic (Pc) as follows in the same manner as step 104 in FIG. 6.

Clutching hydraulic=share pressure (Tt×Ac)×torque share rate (Sc)+return spring pressure (RTN pressure). Generally, it can be said that the term of release shown in FIG. 6 is changed to that of clutch (clutching) shown in FIG. 7.

As described above, when the capacity is provided even for release side hydraulic (a re-rise in release hydraulic) as exemplified by ○4 and ○5 interval of time in FIGS. 3A, 3B, and 3C, the gear shift control including the release and clutching hydraulic calculation processing during the inertia phase in FIGS. 6 and 7 can achieve the gear ratio following hydraulic control at the time of the drive down gear shift, can provide a favorable solution from the standpoint of the items (A), (B), and (C) described before and can make further improvements.

In this embodiment, the clutching and releasing (clutch and release) capacity can be set in accordance with the instantaneous gear ratio. Thus, for example, as shown in FIGS. 4A and 4B, the capacity of each of the clutch and release pressures at the time of the end of inertia phase can finally be assured to become a target value even if the variation in the actual gear ratio is deviated from that of a predicted gear ratio.

Figure 9A:
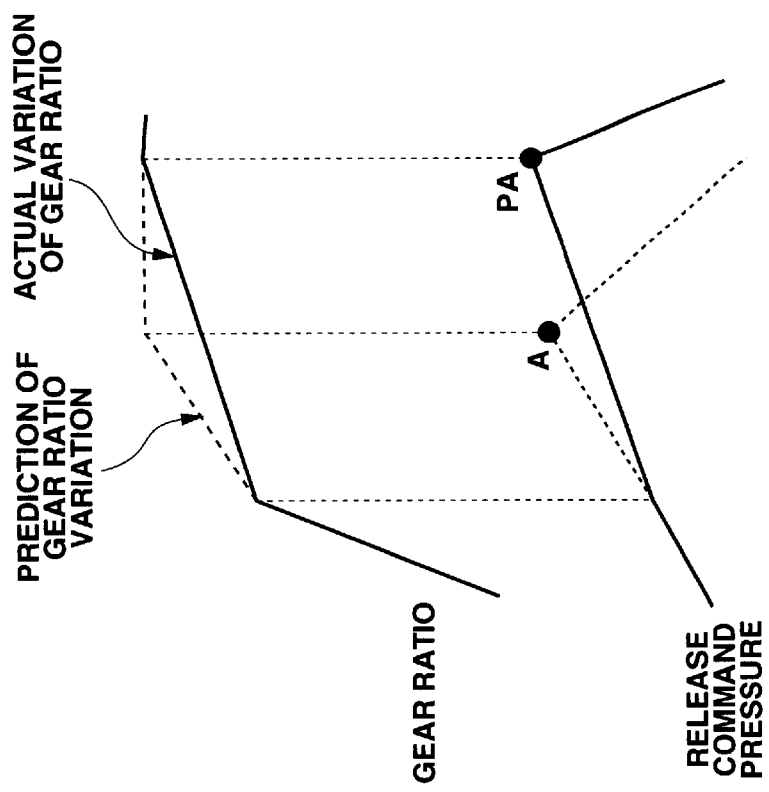
FIGS. 9A and 9B are timing charts representing an example of control contents by the gear ratio following hydraulic control procedure, comparing cases of a comparative example shown in FIGS. 16A and 16B.
Figure 9B:
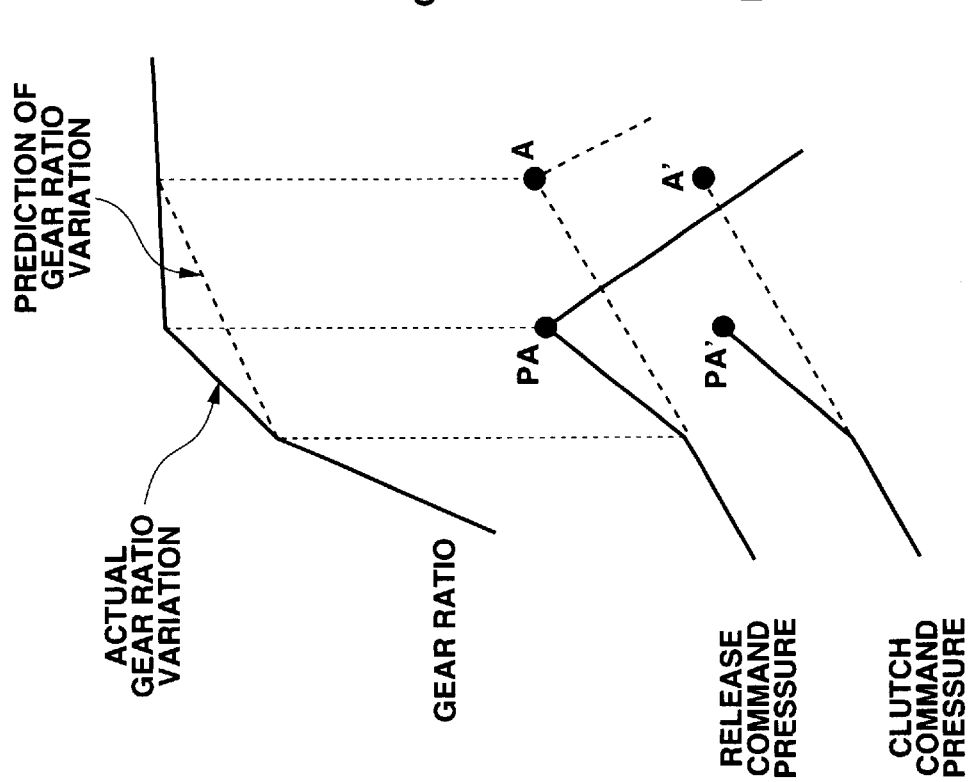

It will be appreciated from FIGS. 9A and 9B that, in place of the rise in hydraulic by the predetermined gradient (gradient control) described in the previously proposed hydraulic control in JP2000-65198, the capacity of each of clutch and release pressure can be outputted which accords always and sequentially with the gear ratio.

Figure 16A:
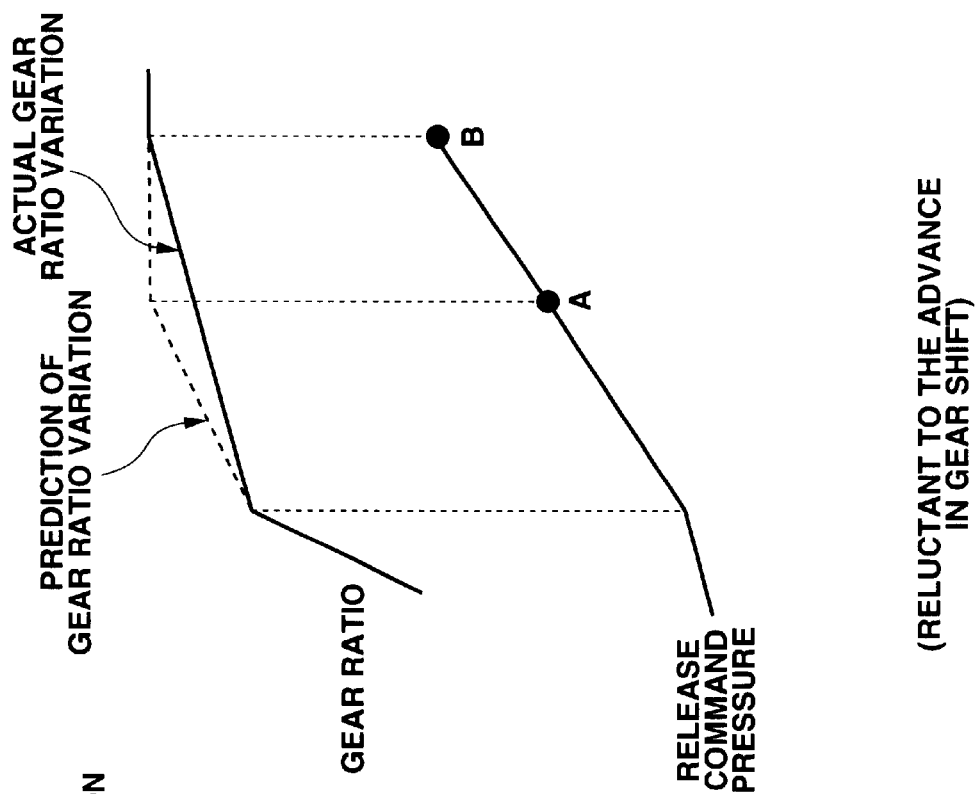
FIGS. 16A and 16B are timing charts for explaining a comparison of the gear ratio following control procedure with previously proposed drive down controllers and representing a relationship from among a gear ratio, release command pressure, and clutch command pressure.

FIG. 9A corresponds to FIG. 16A (the actual input torque is larger than the value that transmission controller 14 has recognized) or release transmission torque is small (too early in the advance of gear shift).

Figure 16B:
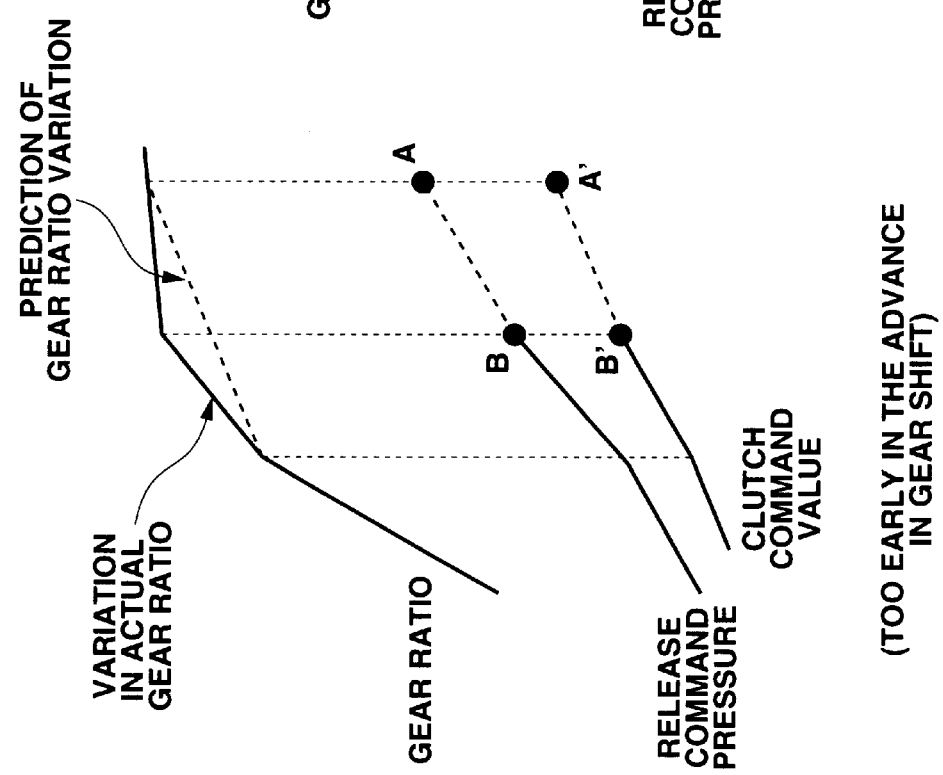

FIG. 9B corresponds to FIG. 16B (the actual input torque is smaller than the value that the transmission controller recognizes or the release transmission torque is large (too late in the advance of the gear shift).

In the case of FIGS. 16A and 16B, when the actual input torque and release transmission torque are different from estimated values thereof so that the end time of the inertia phase is deviated from its predicted time, the hydraulic (working liquid pressure) at the time of the end of inertia phase does not indicate its target value.

On the other hand, the gear shift control in the case of the present invention can cope with the case of FIG. 16A (too early in the advance of gear shift) and that of FIG. 16B (too late in the advance of gear shift).

As denoted by the solid line in FIGS. 9A and 9B, as a result of shifts of release side command pressure PA and clutch side command pressure PA' (it is noted that the shifts thereof as denoted by dot lines in FIGS. 9A and 9B are the variation results by the previously proposed gear shift control disclosed in JP2000-65198A), it will be appreciated that the clutch and release pressure command values at the time of end of inertia phase indicate their target values (the hydraulic equal to the target hydraulic A at the release side at the time of the end of inertia phase and the hydraulic equal to the hydraulic A' at the clutch side at the time of end of inertia phase).

In addition, as described above, if the series of calculations in accordance with the flowcharts shown in FIGS. 6 and 7 are carried out from the time point at which the inertia phase is started in order to prevent the discontinuity of the capacity during the inertia phase and if the capacity during the drive down gear shift is made small at a time immediately after the start of inertia phase, the turbine revolution speed Nt is quickly raised, and the capacity determined for each gear ratio so as to become larger as it approaches more to the end of inertia phase, the discontinuity of control can be avoided and finer and more effective control can be achieved even if the capacity is provided during the inertia phase.

Next, advantages in gear ratio following control according to the present invention will be described below with chief references to FIGS. 10 through 13.

It is noted that, from the standpoint of comparison with the gear ratio following control, the techniques on the previously proposed drive down shift control are exemplified by a Japanese Patent Application First Publication No. Heisei 10-47468 (JP10047468) published on Feb. 20, 1998 (which corresponds to a U.S. Pat. No. 5,888,170 issued on Mar. 30, 1999) and by a Japanese Patent Application First Publication No. 2000-227158 published on Aug. 15, 2000.

Figure 10:
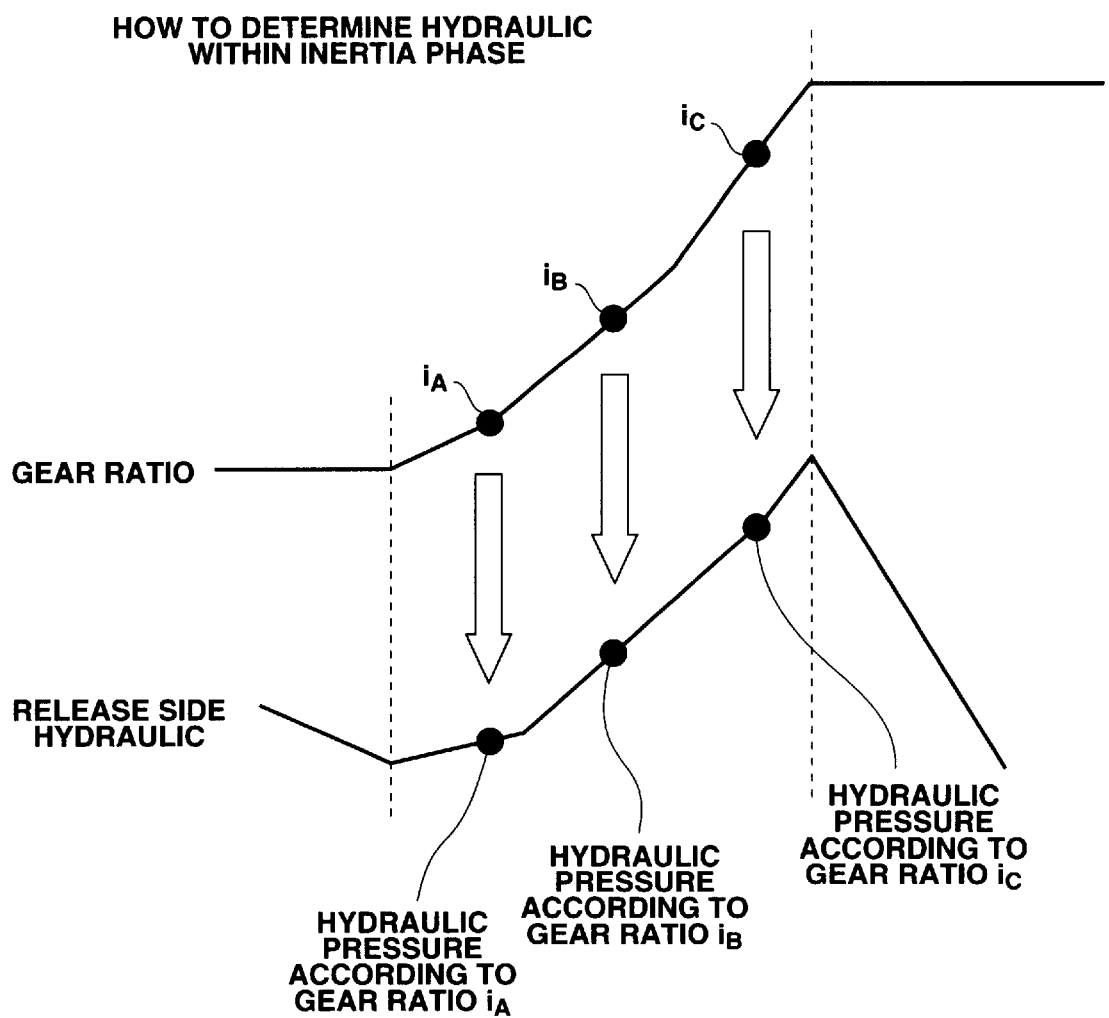
FIG. 10 is an explanatory view for explaining a determination method of the hydraulic during the inertia phase and representing a relationship between the gear ratio and release side hydraulic.

FIG. 10 shows a basic pattern of a method of determining the hydraulic during the inertial phase in the gear ratio following control in a relationship to the release side hydraulic.

In this embodiment, the coefficient by which the share pressure is multiplied is always determined in accordance with the instantaneous gear ratio according to the flowcharts shown in FIGS. 6 and 7. For example, when the present gear ratio indicates "gear ratio $i_A$", "the coefficient is determined in accordance with gear ratio $i_A$. When the present gear ratio indicates "gear ratio $i_B$", "the coefficient is determined in accordance with gear ratio $i_B$. When the present gear ratio indicates "gear ratio $i_C$"," the coefficient is determined in accordance with gear ratio $i_C$.

In this way, as shown in FIG. 10, the hydraulic (pressure) in accordance with gear ratio $i_A$ through gear ratio $i_C$ is determined following the instantaneous (momentary) gear ratio.

Figure 11:
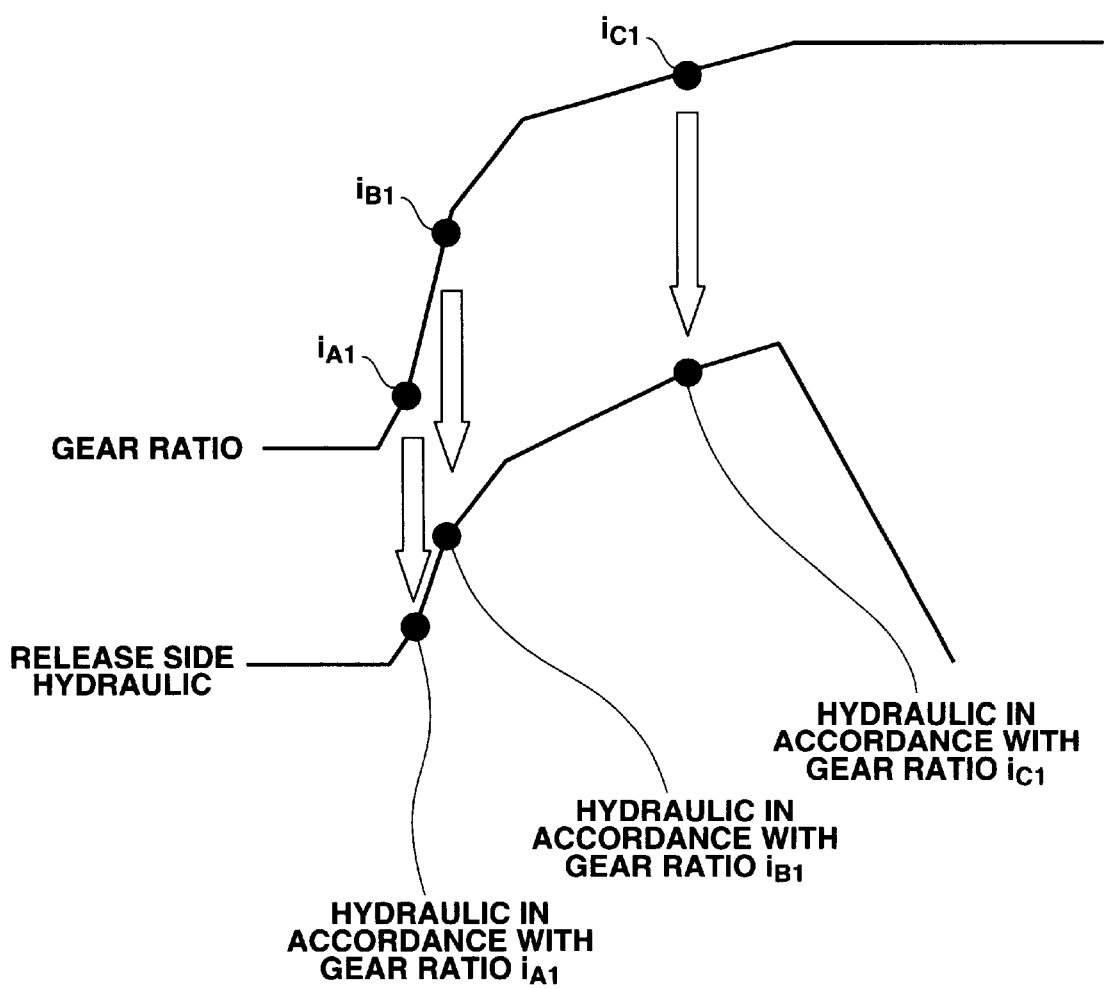
FIG. 11 is an explanatory view for explaining the determination method of hydraulic during the inertia phase and representing an example 1 of too fast (too early) in an-advance state of a gear shift at an initial stage of the gear shift.
Figure 12:
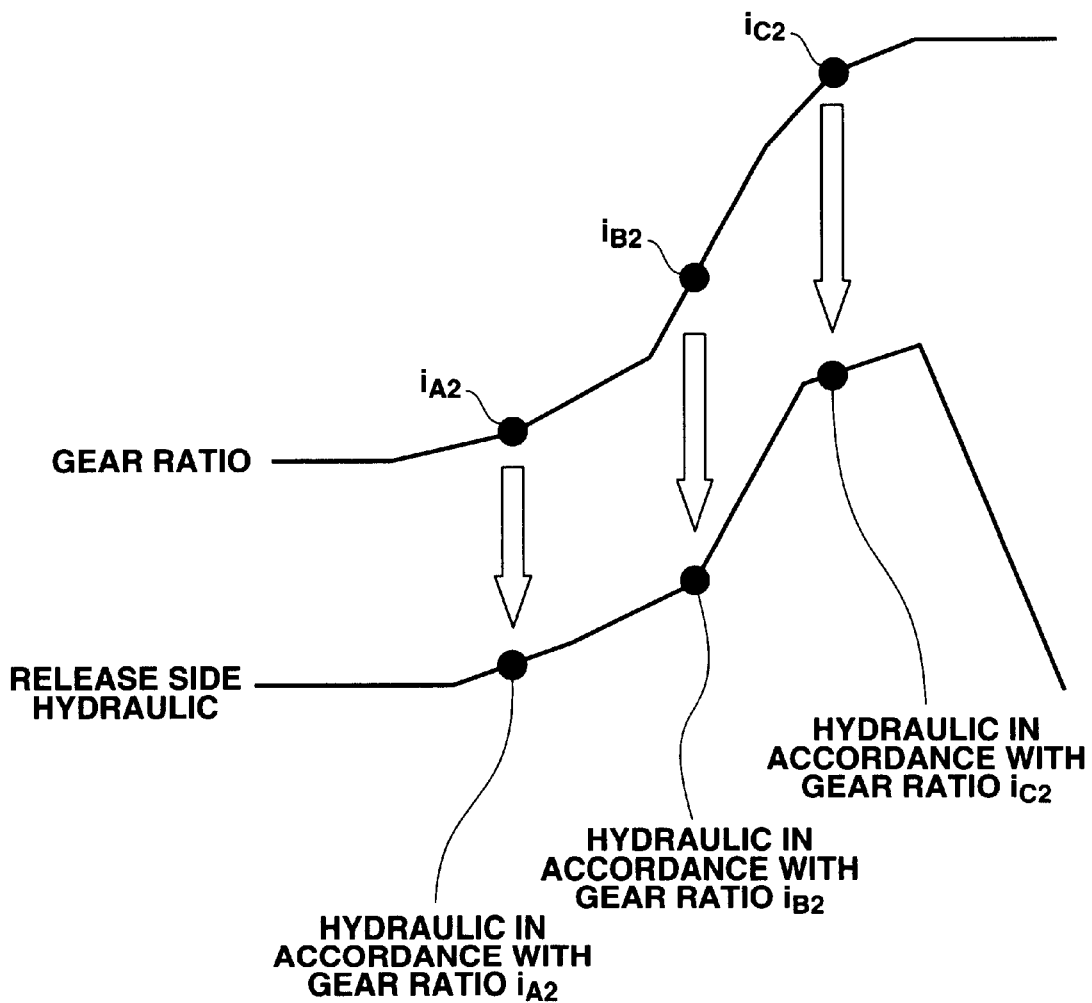
FIG. 12 is an explanatory view for explaining the determination method of hydraulic during the inertia phase and representing an example 2 of too late (too slow) in an advance state of a gear shift at an initial stage of the gear shift.
Figure 13:
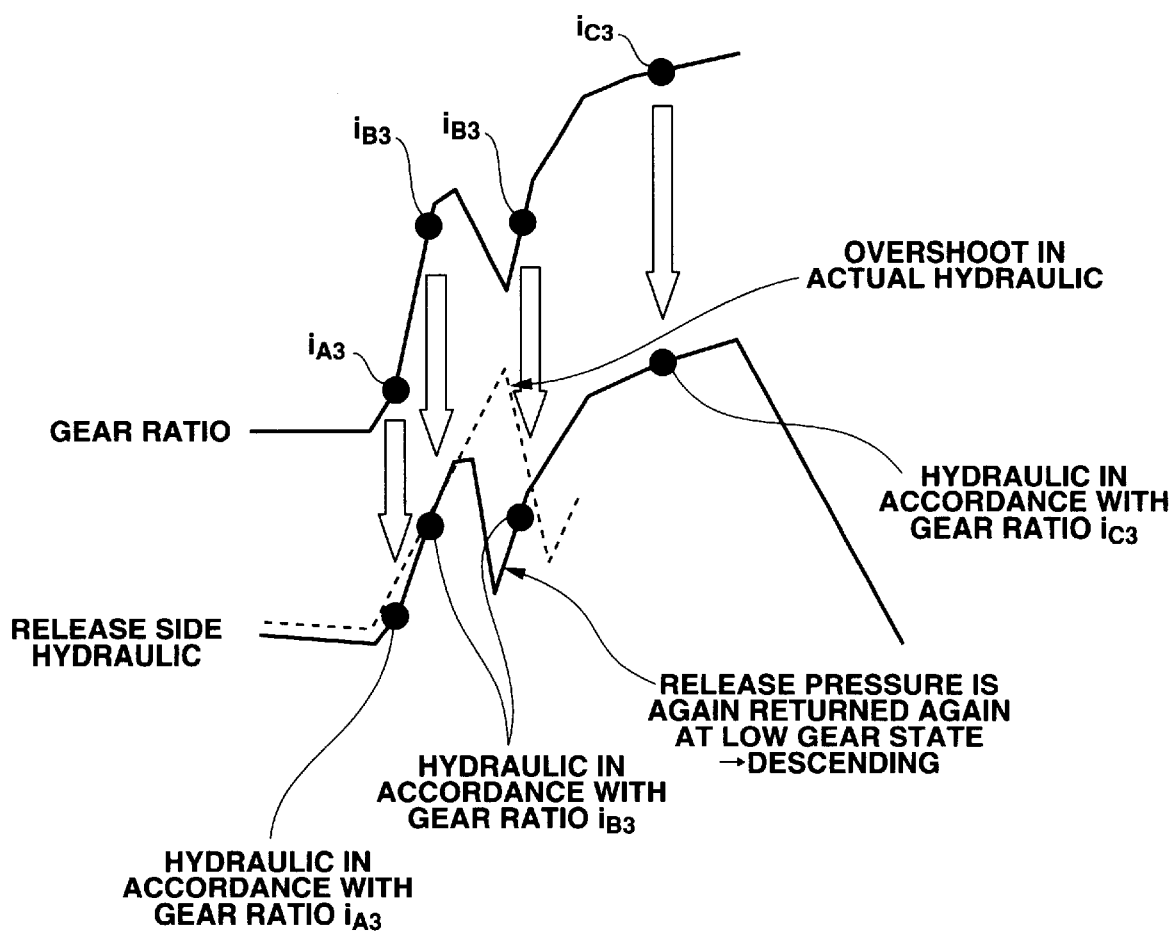
FIG. 13 is an explanatory view for explaining the determination method of hydraulic during the inertia phase and representing an example 3 of a return of the gear shift to its original due to an overshoot in a release side hydraulic.

The following control is possible in cases of Example 1, Example 2, and Example 3 shown in FIGS. 11, 12, and 13, respectively.

EXAMPLE 1

A Case Where the Advance in the Gear Shift at an Initial Stage of Gear Shift is too Early (or too Fast) (FIG. 11)

If the advance in the gear shift is too early (too fast), the gear ratio quickly reaches to a gear ratio $i_{B1}$ as shown in FIG. 11. Hence, it is fast for the release pressure to reach to the hydraulic in accordance with the gear ratio $i_{B1}$.

Consequently, since the release hydraulic is quickly raised, the advance of the gear shift can quickly be suppressed to be slow.

EXAMPLE 2

A Case Where the Advance in the Initial Stage of Gear Shift is too Late (or too Slow) (FIG. 12)

If the advance in the gear shift at the initial stage of inertia phase is too slow, the gear ratio is slow in reaching to a gear ratio $i_{B2}$ as shown in FIG. 12. Hence, it is slow for the release pressure to reach to the hydraulic in accordance with gear ratio $i_{B2}$.

As the result of this, since the rise in the release hydraulic becomes late, the advance in the gear shift at the initial stage thereof becomes fast.

EXAMPLE 3

A Case Where the Gear Shift is Returned to the Original Due to an Overshoot at the Release Side (FIG. 13)

In a case where the release hydraulic is excessively high due to a high deviation in actual hydraulic or due to an overshoot (an overshoot in actual hydraulic denoted by the dot line in FIG. 13) so that the actual gear shift is returned to its original, the actual gear shift is returned to its original.

Hence, as shown in FIG. 13, the gear ratio is accordingly lowered and the release side hydraulic which is the hydraulic in accordance with the gear ratio is also lowered. Consequently, the gear shift is directed in the advance direction.

Therefore, these cases mean that the gear ratio following control has a function that enables an appropriate control for the advance in the gear shift even at the initial stage of gear shift during the inertia phase.

Figure 17:
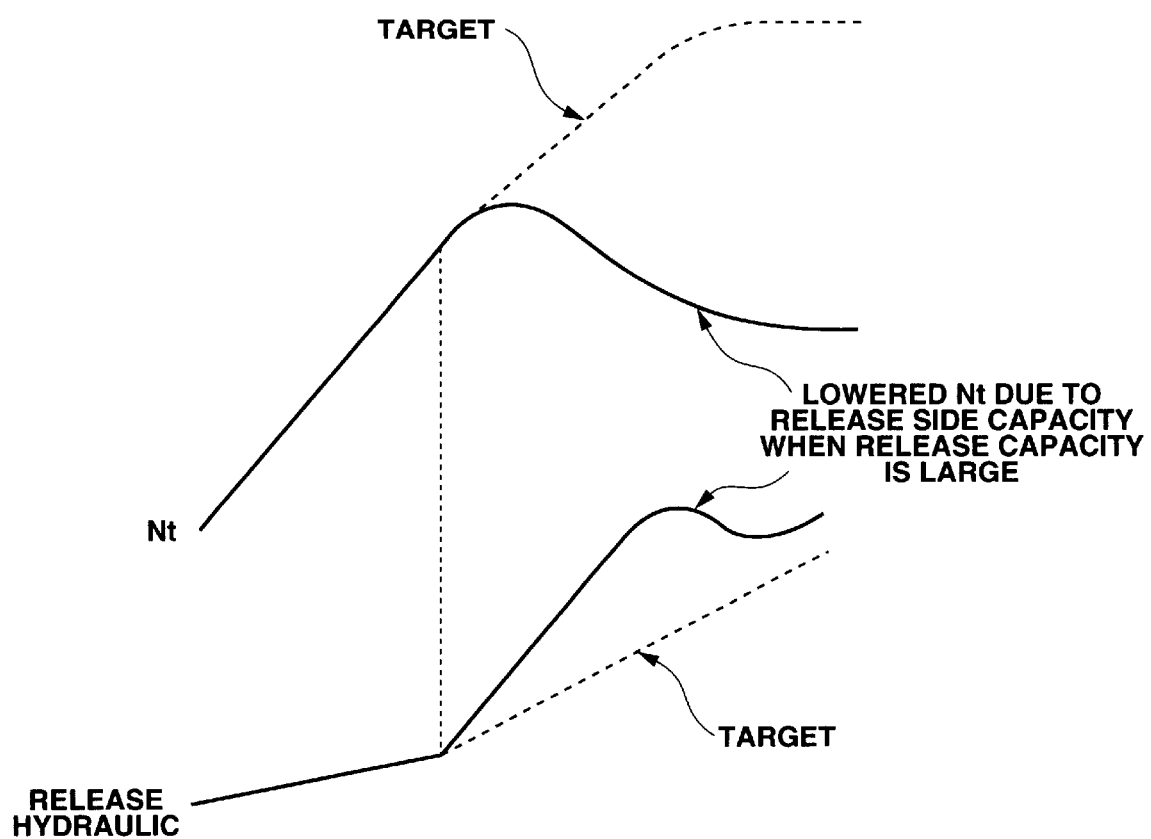
FIG. 17 is an explanatory timing chart representing a relationship between a turbine revolution speed Nt (transmission input axle revolution speed) and the release hydraulic.

As compared with the disclosed downshift controller in the above-described U.S. Pat. No. 5,888,170 (equivalent to JP10047468), the United States patent discloses that, when the gear ratio reaches to a predetermined gear ratio during a drive down inertia phase, the release hydraulic is increased to reduce a gear shift shock. However, as shown in FIG. 17, there is a limit in respect of the fact that, first, only an adjustment of the shock occurring at a time immediately before the end of the gear shift can be made (Since the downshift only at the time immediately before the completion of gear shift, the control at the initial stage of the gear shift cannot be made) and, secondly, there is a possibility that the gear shift is returned to its original due to the increase in the hydraulic (there is a possibility that the rise in the release hydraulic causes the return of the gear shift).

On the other hand, the gear ratio following control according to the present invention brings out a superior gear shift control in the above-described respects.

In addition, in this embodiment,

[1] The release pressure is set according to the instantaneous gear ratio from the time immediately after the inertia phase is started. In this case, preferably,

[2] The hydraulic is given by the coefficient for the share pressure as shown in the flowcharts of FIGS. 6 and 7.

Furthermore, preferably,

[3] The same control as [1] and [2] is applied to the clutch side hydraulic, as shown at step 201 through 204 in FIG. 7 and, in this case, the clutching side coefficient (Ac) at the time of the end of inertia phase may be determined in relation to the release side coefficient (Ac) (preferably, a sum of both clutching and release side coefficients is equal to or greater than 1.0).

Furthermore,

[4] A more effective result can be obtained if the release pressure for which the capacity is provided at the time of the end of inertia phase is drained obliquely (with some gradient).

If doing so, the advance of the gear shift during the inertia phase can always be controlled (f or example, refer to FIGS. 3A and 3B and FIGS. 10 through 13).

In addition, according to the above item [2], even if turbine torque Tt is varied in any increase and decrease direction, the gear ratio following control can cope with the variation in turbine torque Tt. According to the above item [3], the gear ratio following control can guarantee no occurrence of racing at the time of inertia phase.

Figure 14A:
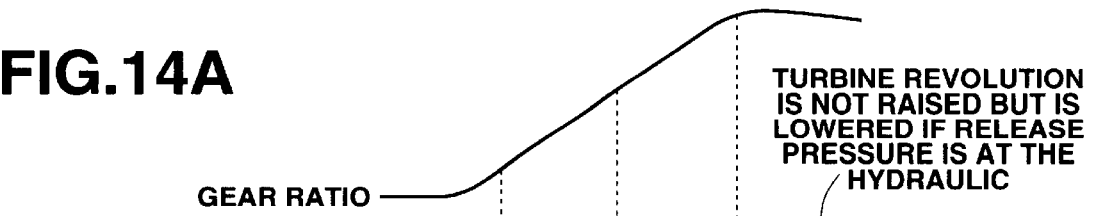
FIGS. 14A, 14B, and 14C are integrally an explanatory view for explaining control contents of the gear ratio following control procedure.
Figure 14B:
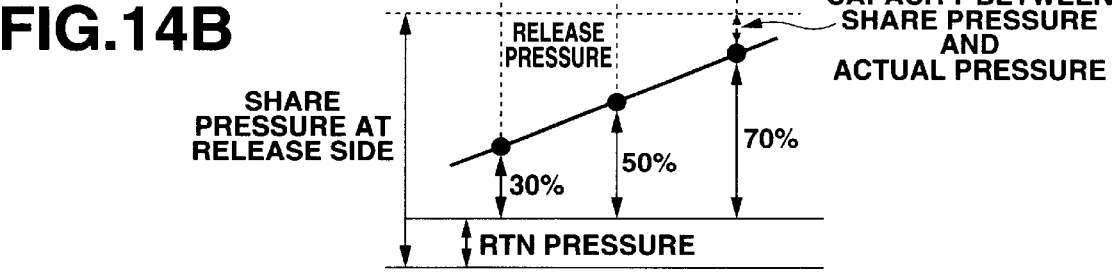
Figure 14C:
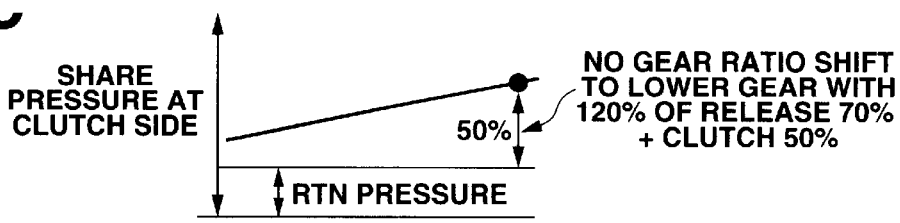

FIGS. 14A, 14B, and 14C show the control contents described in the flowcharts in FIGS. 6 and 7.

As shown in FIGS. 14A, 14B, and 14C, following the varying gear ratio, the release side hydraulic and clutch side hydraulic are determined by adding respective predetermined percentages with respect to the share pressure (in the example of FIGS. 14B and 14C, for example, 30% through 50% at the release side and 50% or less at the clutch side) to RTN pressure (return spring pressure).

If the release pressures are set to hydraulic values shown in FIGS. 14B and 14C, the turbine revolutions are neither raised nor lowered. However, since the remainder of "share pressure—actual pressure" which corresponds to the capacity is used to raise the turbine revolution, this capacity determining an increase speed of the turbine. Hence, it will be appreciated that the advance state of the gear shift can be controlled.

In addition, when such a technique that the coefficient at the clutch side is determined in relation to that at the release side is adopted, the sum of the coefficients of both clutch and release sides is set to be equal to or greater than 1.0 so that no racing occurs.

In the example shown in FIGS. 14A through 14C, since, at the time of the end of inertia phase, the release side coefficient is 70% and the clutch side coefficient is 50% so that the sum of these is 70%+50%=120% (over 1.0), it can be assured that no racing is developed.

Furthermore, according to the above item [4] (the release pressure oblique draining control after the end of inertia phase), a transition to an output torque corresponding to a gear range upon the end of gear shift becomes smooth.

As described above with reference to FIGS. 3A, 3B, 3C, and 5, according to the item [4], the release hydraulic is drained obliquely upon the end of inertia phase so that the clutch and release side frictional elements are tended to be interlocked so that the torque rising at the end of inertia phase is chamfered to prevent the occurrence of the wall feeling described above. This contributes to a control circle at a final scene of the gear shift advance control at the inertia phase.

Figure 15:
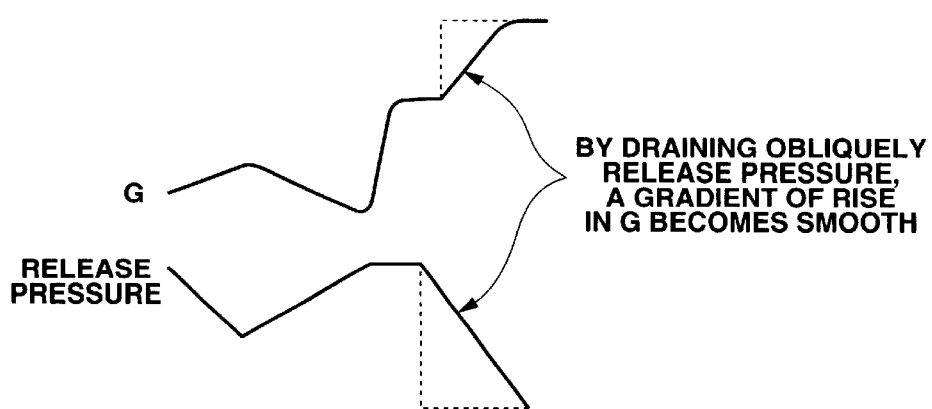
FIG. 15 is an explanatory view for explaining a case wherein a release pressure after an end of inertia phase is drained obliquely.

As shown in FIG. 15, the release pressure is drained obliquely (as compared with a shift of the release pressure denoted by the dot line in FIG. 15) so that a gradient of the rise in G (as compared with a G waveform denoted by the dot line in FIG. 15) becomes smooth.

Figure 18:
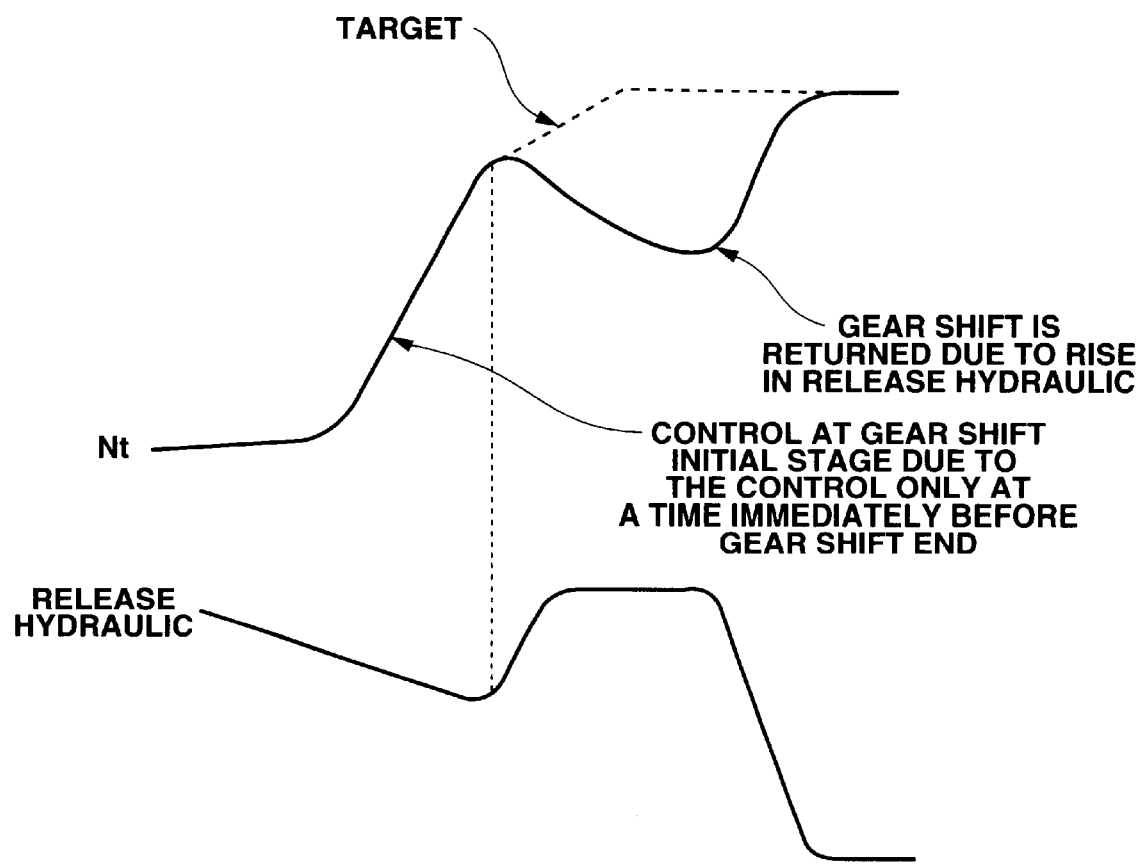
FIG. 18 is an explanatory timing chart representing a relationship between turbine revolution speed Nt (transmission input axle revolution speed) and the release hydraulic in the same manner as FIG. 17.

Next, FIG. 18 shows a relationship between turbine revolution speed Nt and the release hydraulic in the case of the present invention as compared with the drive down shift controller described in the Japanese Patent Application First Publication No. 2000-227158 described above.

In the previously proposed drive down gear shift controller disclosed in the above-described Japanese Patent Application First Publication No. 2000-227158, the release pressure is temporarily increased by a predetermined gradient at a time immediately before the end of the drive down inertia phase to suppress an increase rate in turbine revolution speed Nt.

However, as shown in FIG. 18, if the capacity of the release pressure is excessively large due to the deviation in the hydraulic, the deviation of frictional coefficient of the release side frictional element, and a response delay (so-called, a surge) in the hydraulic, there is a possibility that the turbine revolution speed Nt is pulled down to the release side (when the release capacity is large, the release hydraulic which has the target such as to be raised by the predetermined gradient exhibits such a variation transition as denoted by the solid line of FIG. 18, the variation transition deviating from its target trajectory denoted by the dot line of FIG. 18. Consequently, the release capacity causes the turbine revolution speed Nt to be decreased as denoted by the solid line of FIG. 18 and to be deviated from the target trajectory (denoted by the dot line of FIG. 18).

Therefore, it will be appreciated that in view of the above-described standpoint, the gear ratio following control according to the present invention is more desirable.

That is to say, in the case of the present invention, the release side hydraulic and the clutch side hydraulic are determined from the instantaneous gear ratio (not the gradient control in terms of time). Since, the capacity required at the instantaneous gear ratio can be obtained, the following merits can be derived.

The merits are described as follows:

(i) Even if turbine revolution speed Nt has been determined due to the temporary overshoot of the release pressure, the release pressure is accordingly decreased. Hence, the turbine revolution speed Nt rises (for example, refer to FIG. 13); and (ii) As is different from the above-described previously proposed drive down shift controller disclosed in Japanese Patent Application First Publication No. 2000-227158 in which the gear ratio is triggered and, thereafter, the hydraulic is varied as a function of time, the hydraulic to meet an advance situation of the instantaneous gear shift can always be outputted. In addition, since the gear ratio following control is in a form of an open loop control, such an unstable factor as in a case of a feedback loop control is minor.

As described above, as compared with the previously proposed drive down gear shift controllers disclosed in the U.S. Pat. No. 5,888,170 (equivalent to the Japanese Patent Application First Publication No. Heisei 10-47468 (JP10047468)) and in the Japanese Patent Application First Publication No. 2000-027158 (JP2000227158)), the gear ratio following gear shift controlling apparatus and method according to the present invention can exhibit superior functions.

Although the invention has been described above by reference to the embodiment of the invention, the invention is not limited to the embodiments described above. Modifications and variations of the embodiments described above will occur to those skilled in the art in the light of the above teachings.

For example, in the embodiment described above, the automatic transmission is a, so-called, directly operable valve type in which the working hydraulics (oil pressures) for frictional elements are directly controlled by the individual solenoids. However, the present invention is applicable to any other types of automatic transmissions. In these cases, the same action and advantages can be obtained.

In addition, for example, the gear ratio following control in accordance with the present invention is not limited to independently implement for the release side frictional element. However, although, as desired, the gear ratio following control can be implemented solely for the release side frictional element, the same control can be implemented for the clutch side frictional element in addition to the release side frictional element. This control for both release and clutch side frictional elements can be more effective.

The entire contents of a Japanese Patent Application No. 2000-282322 (filed in Japan on Sep. 18, 2000) are herein incorporated by reference. The scope of the invention is defined with reference to the following claims.

What is claimed is:

1. A gear shift controlling apparatus for an automatic transmission, the automatic transmission comprising a plurality of frictional elements and a pressure controller connecting and disconnecting an actuator working liquid pressure for at least a first frictional element from among the frictional elements to make a gear shift from a first gear range to a second gear range, the gear shift controlling apparatus comprising:
   a pressure controlling section that controls a pressure of the actuator working liquid to vary a torque transmission capacity of the first frictional element; and
   a torque transmission capacity setting section that sets the torque transmission capacity according to an instantaneous gear ratio which varies in accordance with a gear shift from the first gear range to the second gear range, during an inertia phase during which the gear shift from the first gear range to the second gear range occurs.

2. A gear shift controlling apparatus for an automatic transmission, the automatic transmission comprising: a plurality of frictional elements; a first pressure controller to raise an actuator working oil pressure of at least a first one of the frictional elements to transfer the actuator working oil from a release state of the first frictional element to a clutch state thereof; and a second pressure controller to reduce an actuator working oil pressure of at least a second one of the frictional elements to transfer the actuator working oil from the clutch state of the second frictional element to the release state thereof, whereby the automatic transmission makes a gear shift from a first gear range to a second gear range, the gear shift controlling apparatus comprising:
   a first pressure controlling section that controls a first torque transmission capacity for the first frictional element through the first pressure controller;
   a second pressure controlling section that controls a second torque transmission capacity for the second frictional element through the second pressure controller; and
   a torque transmission capacity setting section that sets each of the first and second torque transmission capacities according to an instantaneous gear ratio which varies in accordance with a gear shift from the first gear range to the second gear range, during an inertia phase during which the gear shift from the first gear range to the second gear range occurs.

3. A gear shift controlling apparatus for an automatic transmission as claimed in claim 2, wherein the first gear range is a gear range which is higher than the second gear range, the automatic transmission is associated with an engine, and, when an opening angle of a throttle valve of the engine is equal to or wider than a predetermined value, the automatic transmission makes a drive down gear shift from the first gear range to the second gear range and wherein the torque transmission capacity setting section sets the second torque transmission capacity according to the gear ratio for the second torque transmission capacity at a time of an end stage of the inertia phase to become larger than that at a time of an initial stage of the inertia phase.

4. A gear shift controlling apparatus for an automatic transmission, the automatic transmission comprising a plurality of frictional elements and the automatic transmission being enabled to make a gear shift by a release-to-clutch control in such a manner that while a first one of the frictional elements is released by a decrease pressure control for a working liquid pressure, a second one of the frictional elements is clutched by an increase pressure control for the working liquid pressure, the gear shift controlling apparatus comprising:
   a release-to-clutch controlling section that controls the working liquid pressure for each of the first and second frictional elements to make the gear shift in the automatic transmission in such a manner that while the first frictional element is released by the decrease pressure control for the working liquid pressure, the second frictional element is clutched by the increase pressure control for the working liquid pressure; and
   a release capacity setting section that sets a release capacity during an inertia phase during which the gear shift from a first gear range to a second gear range occurs in accordance with an instantaneous gear ratio during the inertia phase so as to output the release capacity set according to the instantaneous gear ratio.

5. A gear shift controlling apparatus for an automatic transmission as claimed in claim 4, which further comprises a clutch capacity setting section that sets a clutch capacity during an inertia phase during which the gear shift from a first gear range to a second gear range occurs in accordance with an instantaneous gear shift during the inertia phase so as to output the clutch capacity set according to the instantaneous gear shift.

6. A gear shift controlling apparatus for an automatic transmission as claimed in claim 4, wherein the release capacity setting section comprises a release capacity calculating section that starts a calculation on the release capacity which is set in accordance with the instantaneous gear ratio fro a time at which the inertia phase is started.

7. A gear shift controlling apparatus for an automatic transmission as claimed in claim 5, wherein the clutch capacity setting section comprises a clutch capacity calculating section that starts a calculation on the clutch capacity which is set in accordance with the instantaneous gear ratio from a time at which the inertia phase is started.

8. A gear shift controlling apparatus for an automatic transmission as claimed in claim 7, wherein the first gear range is a gear range which is higher than the second gear range, the automatic transmission is associated with an engine, and, when an opening angle of a throttle valve of the engine is equal to or wider than a predetermined value, the automatic transmission makes a drive down shift and wherein, during the drive down gear shift, the release capacity is set in accordance with the instantaneous gear ratio in such a manner that the release capacity is made small at a time immediately after a start of inertia phase, a turbine revolution is quickly raised, and, as the inertia phase becomes approached further to an end, the release capacity becomes larger.

9. A gear shift controlling method for an automatic transmission, the automatic transmission comprising a plurality of frictional elements and a pressure controller connecting and disconnecting an actuator working liquid pressure for at least a first one of the frictional elements to make a gear shift from a first gear range to a second gear range, the gear shift controlling method comprising:

controlling a pressure of the actuator working liquid to vary a torque transmission capacity of the first frictional element; and setting the torque transmission capacity according to an instantaneous gear ratio which varies in accordance with a gear shift from the first gear range to the second gear range, during an inertia phase during which the gear shift from the first gear range to the second gear range occurs.

10. A gear shift controlling method for an automatic transmission, the automatic transmission comprising: a plurality of frictional elements; a first pressure controller to raise an actuator working oil pressure of at least a first frictional element to transfer the actuator working oil from a release state of the first frictional element to a clutch state thereof; and a second pressure controller to reduce a n actuator working oil pressure of at least a second frictional element to transfer the actuator working oil from the clutch data of the second frictional element to the release state thereof, whereby the automatic transmission makes a gear shift from a first gear range to a second gear range, the gear shift controlling method comprising:

controlling a first torque transmission capacity for the first frictional element through the first pressure controller;

controlling a second torque transmission capacity for the second frictional element through the second pressure controller; and setting each of the first and second torque transmission capacities according to an instantaneous gear ratio which varies in accordance with a gear shift from the first gear range to the second gear range during an inertia phase during which the gear shift from the first gear range to the second gear range occurs.

11. A gear shift controlling apparatus for an automatic transmission as claimed in claim 10, wherein the first gear range is a gear range which is higher than the second gear range, the automatic transmission is associated with an engine, and, when an opening angle of a throttle valve of the engine is equal to or wider than a predetermined value, the automatic transmission makes a drive down gear shift from the first gear range to the second gear range and, at the torque transmission capacity setting, the second torque transmission capacity is set according to the gear ratio for the second torque transmission capacity at a time of an end stage of the inertia phase to become larger than that at a time of an initial stage of the inertia phase.

12. A gear shift controlling method for an automatic transmission, the automatic transmission comprising a plurality of frictional elements and the automatic transmission being enabled to make a gear shift by a release-to-clutch control in such a manner that while a first one of the frictional elements is released by a decrease pressure control for a working liquid pressure, a second one of the frictional elements is clutched by an increase pressure control for the working liquid pressure, the gear shift controlling method comprising:

controlling the working liquid pressure for each of the first and second frictional elements to make the gear shift in the automatic transmission in such a manner that while the first frictional element is released by the decrease pressure control for the working liquid pressure, the second frictional element is clutched by the increase pressure control for the working liquid pressure; and setting a release capacity during an inertia phase during which the gear shift from a first gear range to a second gear range occurs in accordance with an instantaneous gear ratio during the inertia phase so as to output the release capacity set according to the instantaneous gear ratio.

13. A gear shift controlling method for an automatic transmission as claimed in claim 12, further comprising setting a clutch capacity during the inertia phase during which the gear shift from the first gear range to the second gear range occurs in accordance with an instantaneous gear ratio during the inertia phase so as to output the clutch capacity set according to the instantaneous gear ratio.

14. A gear shift controlling method for an automatic transmission as claimed in claim 13, wherein, at the release capacity setting step, starting a calculation on the release capacity which is set in accordance with the instantaneous gear ratio from a time at the inertia phase is started.

15. A gear shift controlling method for an automatic transmission as claimed in claim 14, wherein, at the clutch capacity setting, starting a calculation on the clutch capacity which is set in accordance with the instantaneous gear ratio from a time at which the inertia phase is started.

16. A gear shift controlling method for an automatic transmission as claimed in claim 15, wherein the gear shift range is a gear range which is higher than the second gear range so that the automatic transmission is associated with an engine and an opening angle of a throttle valve of the engine is equal to or wider than a predetermined value so that the automatic transmission makes a drive down shift and wherein, during the drive down gear shift, the release capacity is set in accordance with the instantaneous gear ratio in such a manner that the release capacity is made small at a time immediately after a start of the inertia phase, a turbine revolution is quickly raised, and, as the inertia phase becomes approached to an end, the release capacity becomes larger.

17. A gear shift controlling method for an automatic transmission as claimed in claim 16, wherein, during the drive down gear shift, the clutch capacity is set in accordance with the instantaneous gear ratio in such a manner that the clutch capacity is made small at a time immediately after the start of the inertia phase, a turbine revolution is quickly raised, and, as the inertia phase becomes approached furthermore to its end, the clutch capacity becomes larger.

18. A gear shift controlling method for an automatic transmission as claimed in claim 17, wherein, during the drive down gear shift, the release capacity is calculated from a release side working liquid pressure command value (Po) as follows: share pressure (Tt×Ao)×torque share rate (So)+ RTN pressure, wherein Tt denotes a turbine torque estimated from a turbine revolution speed (Nt) and an opening angle (TVO) of the throttle valve of the engine, Ao denotes a share pressure conversion coefficient of the working liquid pressure for the first frictional element to be released read from the estimated turbine torque Tt, and So denotes a release side frictional element toque share rate previously set according to the gear ratio from a time at which the inertia phase is started to a time at which the inertia phase is ended, and RTN pressure denotes a return spring pressure which corresponds to a hydraulic at which a related piston has reached to its full stroke.

19. A gear shift controlling method for an automatic transmission as claimed in claim 17, wherein, during the drive down gear shift, the clutch capacity is calculated from a clutch side working liquid pressure command value (Pc) as follows: share pressure (Tt×Ac)×torque share rate (Sc)+ RTN pressure, wherein Ac denotes a share pressure conversion coefficient of the working liquid pressure for the second frictional element to be clutched read from the estimated turbine torque Tt, and Sc denotes a clutch side frictional element toque share rate previously set according to the gear ratio from a time at which the inertia phase is started to a time at which the inertia phase is ended.

20. A gear shift controlling method for an automatic transmission as claimed in claim 19, wherein So+Sc≧1.0.

* * * * *